(12) United States Patent
Hirose et al.

(10) Patent No.: US 6,795,831 B2
(45) Date of Patent: Sep. 21, 2004

(54) METHOD OF MANAGING KNOWLEDGE INFORMATION, METHOD OF GENERATING KNOWLEDGE INFORMATION, METHOD OF USING KNOWLEDGE INFORMATION, AND APPARATUS FOR MANAGING KNOWLEDGE INFORMATION

(75) Inventors: Morikatsu Hirose, Kawasaki (JP); Iwao Yamamoto, Kawasaki (JP); Hisayuki Sano, Kawasaki (JP); Masayoshi Kikuchi, Kawasaki (JP); Kenji Toeda, Kawasaki (JP); Hisao Kadoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 10/100,996

(22) Filed: Mar. 20, 2002

(65) Prior Publication Data

US 2002/0143776 A1 Oct. 3, 2002

(30) Foreign Application Priority Data

Mar. 29, 2001 (JP) ....................................... 2001-095317

(51) Int. Cl.[7] .............................................. G06F 17/30
(52) U.S. Cl. .............................. 707/201; 707/10; 707/8
(58) Field of Search ................................ 707/201, 200, 707/10, 8

(56) References Cited

U.S. PATENT DOCUMENTS

| | | | |
|---|---|---|---|
| 6,195,697 B1 * | 2/2001 | Bowman-Amuah | 709/224 |
| 6,240,416 B1 * | 5/2001 | Immon et al. | 707/10 |
| 6,721,726 B1 * | 4/2004 | Swaminathan et al. | 707/3 |
| 6,754,677 B1 * | 6/2004 | Cho et al. | 707/201 |

FOREIGN PATENT DOCUMENTS

| | | |
|---|---|---|
| JP | 03046059 A | 2/1991 |
| JP | 06012460 A | 1/1994 |
| JP | 06075760 A | 3/1994 |
| JP | 08147152 A | 6/1996 |
| JP | 09034696 A | 2/1997 |
| JP | 09212353 A | 8/1997 |
| JP | 2000-020542 A | 1/2000 |

OTHER PUBLICATIONS

Garcia–Luna–Aceves et al., An Open–Systems Model for Computer–Suported Collaboration, Computer Workstations, Proceedings of the 2nd IEEE Conf. on, Mar. 1988, p. 40–51.*

Kim et al., Dynamic Configuration Management in Reliable Distributed Real–Time Information Systems, Knowledge and Data Engineering, IEEE Transactions on, vol. 11 issue 1, Jan.–Feb. 1999, p. 239–254.*

(List continued on next page.)

*Primary Examiner*—Greta Robinson
(74) *Attorney, Agent, or Firm*—Staas & Halsey LLP

(57) ABSTRACT

A knowledge information managing apparatus manages knowledge information to reuse information of analytical details and a process which have led to information as a fruit. The knowledge information managing apparatus accumulates dialogue streams including the contents of a series of message data exchanged between persons involved in a business through a network. The knowledge information managing apparatus also sequentially accumulates objects required to perform the business in a process from generation of the problem to a conclusion about the problem, in a state in which the objects are required. The knowledge information managing apparatus relates a desired one of the accumulated dialogue streams and a desired one of the accumulated objects to each other in response to a relating request, and outputs information about the desired dialogue stream and the desired object which are related to each other in response to a related information acquiring request.

20 Claims, 30 Drawing Sheets

OTHER PUBLICATIONS

Hartzman et al., A Relational Approach to Query Data Streams, Knowledge and Data Engineering, IEEE Transactions on, vol. 2 issue 4, Dec. 1990, p. 401–409.*

Garcia–Luna–Aceves et al., An Open–Systems Model for Computer–Suported Collaboration, Computer Workstations, Proceedings of the 2nd IEEE Conf. on, Mar. 1988, p. 40–51.*

Kim et al., Dynamic Configuration Management in Reliable Distributed Real–Time Information Systems, Knowledge and Data Engineering, IEEE Transactions on, vol. 11 issue 1, Jan.–Feb. 1999, p. 239–254.*

Hartzman et al., A Relational Approach to Query Data Streams, Knowledge and Data Engineering, IEEE Transactions on, vol. 2 issue 4, Dec. 1990, p. 401–409.*

* cited by examiner

FIG. 19

| 90 RETRIEVED RESULT VIEW | | |
|---|---|---|
| 91 OBJECT NAME (DOCUMENT NAME) | 92 EVALUATION | 93 LIST OF PROCESSES/ TECHNIQUES |
| AAA.doc BBB.doc CCC.doc ... | A | COMPUTER (10) NETWORK (8) ONLINE TRADE (7) STOCK (7) ... |
| | | |

500 RETRIEVAL SPECIFYING VIEW

| ORIGIN | TYPE | SUBJECT | AUTHOR | ORIGINAT-ING DATE |
|--------|------|---------|--------|-------------------|
| ✓ | | | | |
| | | | | |
| | | | | |
| ✓ | | | | |
| | | | | |
| | | | | |
| | | | | |
| | | | | |
| | | | | |
| | | | | |
| | | | | |
| | | | | |
| | | | | |
| | | | | |
| | | | | |

METHOD OF MANAGING KNOWLEDGE INFORMATION, METHOD OF GENERATING KNOWLEDGE INFORMATION, METHOD OF USING KNOWLEDGE INFORMATION, AND APPARATUS FOR MANAGING KNOWLEDGE INFORMATION

BACKGROUND OF THE INVENTION (1) Field of the Invention

The present invention relates to a method of managing knowledge information, a method of generating knowledge information, a method of using knowledge information, and an apparatus for managing knowledge information, and more particularly to a method of managing knowledge information, a method of generating knowledge information, a method of using knowledge information, and an apparatus for managing knowledge information for the purpose of reusing knowledge information shared between a plurality of users.

(2) Description of the Related Art

With the rapid progress at present of electronic databases of information, almost all documents produced for business are generated as electronic data using word processors or the like. Documents available as electronic data include a wide variety of knowledge. Knowledges contained in the electronic data generated in certain business applications often provide reference materials for other similar business occasions. Therefore, it has been desired to manage knowledges contained in electronic data and make such electronic data available for reuse.

One system for managing knowledges contained in electronic data is a knowledge management system. The knowledge management system stores various items of information (the fruits of actions such as proposals, designs, programs, etc.) as a library. The knowledge management system allows users to reuse the knowledge stored in the library, thereby preventing the users from repeating the same processes as done before for improved business efficiency.

The information stored in the library of the knowledge management system represents only "results", and any information representing analytical details and processes that have led to the results is not stored in the library. Therefore, there has been nothing for the users to rely on for reusing information representing analytical details and processes.

Recently, there has been developed a network-connected environment in which analytical details and processes that have led to certain information (fruits) are stored by collaboration tools such as teleconference systems and bulletin board systems, for example. However, there has not been available any method of organically relating and managing information (fruits) registered in a library and information representative of analytical details and processes that have led to information stored by collaboration tools.

Therefore, it has been desired to solve the following problems:

Problem 1: Only Final Fruits Have Been Reused

An investigation of a certain business has indicated that information (fruits) stored in a library with respect to the business is only about 5% of the information that is produced day after day. Generally, information that users may want to reuse includes not only information about proposals, designs, and programs which is stored in a library, but also information about analytical details and processes that have led to the stored information (or that have led to the conclusions which the stored information has). It is presumed that the information about analytical details and processes reaches 95% of all the information.

The 95% information has not been reused but left unused because no storage means and no retrieval means have been available for effectively reusing the information. It has long been desirous of reusing the information for achieving continuous cost reductions and process improvements.

Close scrutiny of the final fruits shows that there are many projects which are similar to each other with respect to the forms of target systems and the processes of accomplishing the systems. If information can be exchanged and shared between such similar projects while the projects are under way, then a considerable reduction of the overall cost of the projects can be expected. However, there has been available no means for sharing and indicating such information.

Problem 2: Information has Been Reused Only Locally

If information generated with respect to a previous project is to be reused by a subsequent project, then it has been customary for the subsequent project to reuse fruits (proposals, designs, and programs), themselves, of the previous project which have been stored in a library. In a large company, several thousand projects are newly produced and completed each year, and products of these projects are stored in servers connected to the network. Many of these projects are similar to each other. Nevertheless, the products are reused only within departments and sections, i.e., locally.

Problem 3: Projects are Reused Only Separately

The fruits (products) of a project can directly be reused in relatively many cases. In order to keep up with recent technological innovations that are developed at a rate often referred to as dog year (meaning that a normal year corresponds to about seven years, based on the rate at which dogs age 7 times faster than humans), there have recently been demands for using a combination of best aspects of the products of projects as best practices. However, it has been difficult to select best-practice information from a vast number of products. It has also been difficult to rely on a manual process to evaluate individual products individually and reconstruct them as a collection of information.

SUMMARY OF THE INVENTION

It is therefore an object of the present invention to provide a method of and an apparatus for managing knowledge information in a manner to allow users to reuse information representing analytical details and processes which have led to a collection of information representing fruits.

Another object of the present invention is to provide a method of generating knowledge information to collect information representing analytical details and processes which have led to a collection of information representing fruits for thereby presenting best practices.

Still another object of the present invention is to provide a method of using knowledge information to reuse information representing analytical details and processes which have led to a collection of information representing fruits.

According to the present invention, there is provided a method of managing knowledge information for a computer which manages knowledge information shared through a network. The method comprises the steps of managing a series of message data exchanged between persons involved in a business through the network in order to perform the business to solve a problem, accumulating dialogue streams containing contents of the series of message data, and sequentially accumulating objects required to perform the business in a process from generation of the problem to a conclusion about the problem, in a state in which the objects are required, relating a desired one of the accumulated dialogue streams and a desired one of the accumulated objects to each other in response to a relating request, and outputting information about the desired dialogue stream and the desired object which are related to each other in response to a related information acquiring request.

According to the present invention, there is also provided an apparatus for managing knowledge information shared through a network. The apparatus comprises dialogue stream accumulating means for managing a series of message data exchanged between persons involved in a business through the network in order to perform the business to solve a problem, and accumulating dialogue streams containing contents of the series of message data, object accumulating means for sequentially accumulating objects required to perform the business in a process from generation of the problem to a conclusion about the problem, in a state in which the objects are required, relating means for relating a desired one of the dialogue streams accumulated by the dialogue stream accumulating means and a desired one of the objects accumulated by the object accumulating means to each other in response to a relating request, and outputting means for outputting information about the desired dialogue stream and the desired object which are related to each other in response to a related information acquiring request.

According to the present invention, there is further provided a method of generating knowledge information for a computer which analyzes contents of knowledge information. The method comprises the steps of in response to a retrieval request, collecting items of knowledge information matching the retrieval request from items of knowledge information accumulated in another computer connected to the computer through a network, combining desired items of knowledge information from the collected items of knowledge information matching the retrieval request to generate new knowledge information, and outputting the generated new knowledge information.

According to the present invention, there is further provided a method of using knowledge information for a computer which uses through a network knowledge information which comprises dialogue streams containing a series of message data exchanged between persons involved in a business through the network in order to perform the business to solve a problem, and objects required to perform the business in a process from generation of the problem to a conclusion about the problem. The method comprises the steps of outputting a relating request specifying a desired one of accumulated dialogue streams and a desired one of accumulated objects to a server computer which has accumulated the knowledge information in response to a control input, outputting a related information acquiring request about the desired dialogue stream and the desired object which are related to each other to the server computer in response to a control input, and displaying information transmitted from the server computer in response to the related information acquiring request.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 19 is a view showing a displayed retrieved result view;

FIG. 21 is a view showing a displayed retrieval specifying view;

DESCRIPTION OF THE PREFERRED EMBODIMENTS

Figure 1:
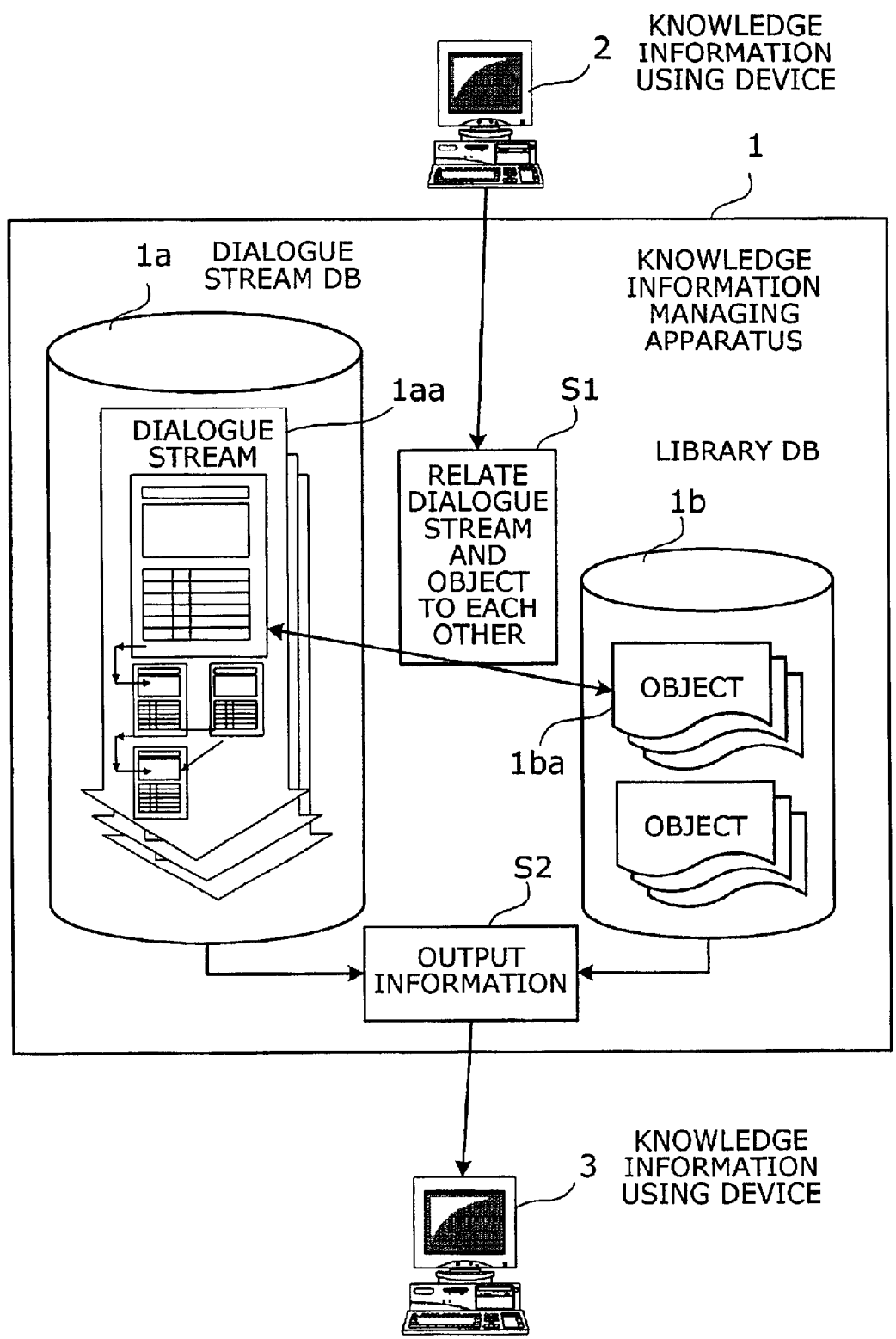
FIG. 1 is a block diagram showing the principles of the present invention.

FIG. 1 shows in block form the principles of the present invention. As shown in FIG. 1, a plurality of knowledge information using devices 2, 3 are connected to a knowledge information managing apparatus 1 via a network (information communication circuit network). In order to perform a business for the purpose of solving a problem, the knowledge information managing apparatus 1 manages a series of message data exchanged between persons involved in the business via the network, and stores dialogue streams 1*aa* containing contents of the series of message data in a dialogue stream database (DB) 1*a*. The dialogue streams 1*aa* each comprise a chronological record of communications between persons which are made up of arguments presented in an attempt to solve the problem and comments given by third parties, for example.

The knowledge information managing apparatus 1 also stores objects 1*ba* required for performing the business in a process from the generation of the problem to the conclusion, in a sequential library DB 1*b* in a state at the time they are needed to perform the business. The objects 1*ba* are all objects required to perform the business, such as an object (e.g., a proposal, a design, or a program) serving as a starting material for performing the business, an object (e.g., a proposal, a design, or a program which is newly found) that is referred to while the business is being performed, an object (e.g., minutes, a memorandum, or a draft of a final fruit) that is produced while the business is being performed, and an object that is perfected when the business is completed.

The knowledge information managing apparatus 1 relates a desired dialogue stream from the stored dialogue streams and a desired object from the stored objects to each other in response to a relating request sent from the knowledge information using device 2 in STEP S1. The knowledge information managing apparatus 1 also outputs information relative to the desired dialogue stream and the desired object which have thus been related to each other in response to a related information acquisition request sent from the knowledge information using device 3 in STEP S2.

In this manner, a dialogue stream and an object which is required to perform a business are related to each other, and information relative to the dialogue stream and the object which have thus been related to each other is outputted in response to a related information acquisition request. Objects which are stored are not only objects used in final conclusions but also objects which are required. Therefore, if a dialogue stream which is discussed in connection with a desired problem is found, then not only objects as fruits, but also objects that are used interim can be reused.

An embodiment of the present invention where the principles of the present invention are applied to a client server system (knowledge management system) will be described below.

Figure 2:
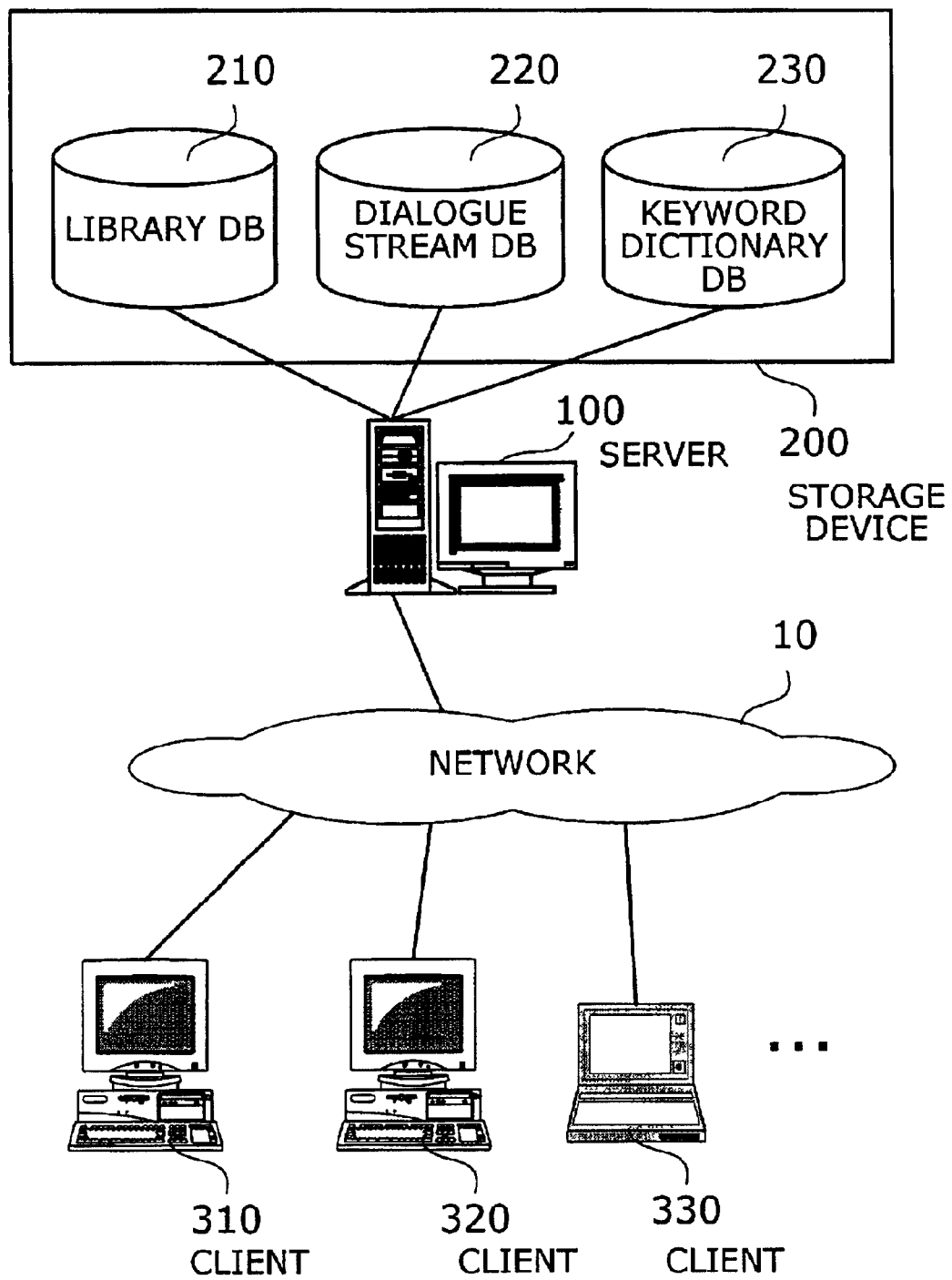
FIG. 2 is a diagram showing the concept of a system arrangement according to an embodiment of the present invention.

FIG. 2 shows the concept of a system arrangement of the client server system according to the embodiment of the present invention. In FIG. 2, a server computer (server) 100 and a plurality of client computers (clients) 310, 320, 330 are connected to each other via a network 10. The network 10 comprises the Internet or an intranet, for example. A storage device 200 in which a plurality of databases are constructed is connected to the server 100. While only one server 100 is shown in FIG. 2 for the sake of brevity, a plurality of servers may be connected to the network 10.

The storage device 200 comprises a recording medium such as a hard disk driver or the like. The storage device 200 stores a library database (DB) 210, a dialogue stream database (DB) 220, and a keyword dictionary database (DB) 230. The storage device 200 also stores an OS (Operating System) and programs for managing the DBs.

The library DB 210 stores objects required to perform businesses, such as an object (e.g., a proposal, a design, or a program) serving as a starting material for performing a business, an object (e.g., a proposal, a design, or a program which is newly found) that is referred to while a business is being performed, an object (e.g., minutes, a memorandum, or a draft of a final fruit) that is produced while the business is being performed, and an object that is perfected when the business is completed. The objects comprise document files produced on word processors, CAD (Computer Aided Design) data, image data, and audio data.

The dialogue stream DB 220 is a database of dialogue streams including a series of messages (message documents) exchanged between a plurality of persons involved in performing businesses (a chronological record of communications between persons which are made up of arguments presented in an attempt to solve a problem and comments given by third parties) and related information between message documents. The dialogue streams comprise the data of comments in bulletin board systems and ToDo data (data generated by software for managing proposals to perform businesses and requests to perform businesses).

The keyword dictionary DB 230 is a database of dictionary data containing registered keywords belonging to a variety of fields. The keyword dictionary DB 230 comprises a thesaurus (a dictionary of synonyms and related words), for example.

The clients 310, 320, 330 are terminal devices that are used by workers and managers involved in performing various businesses.

Figure 3:
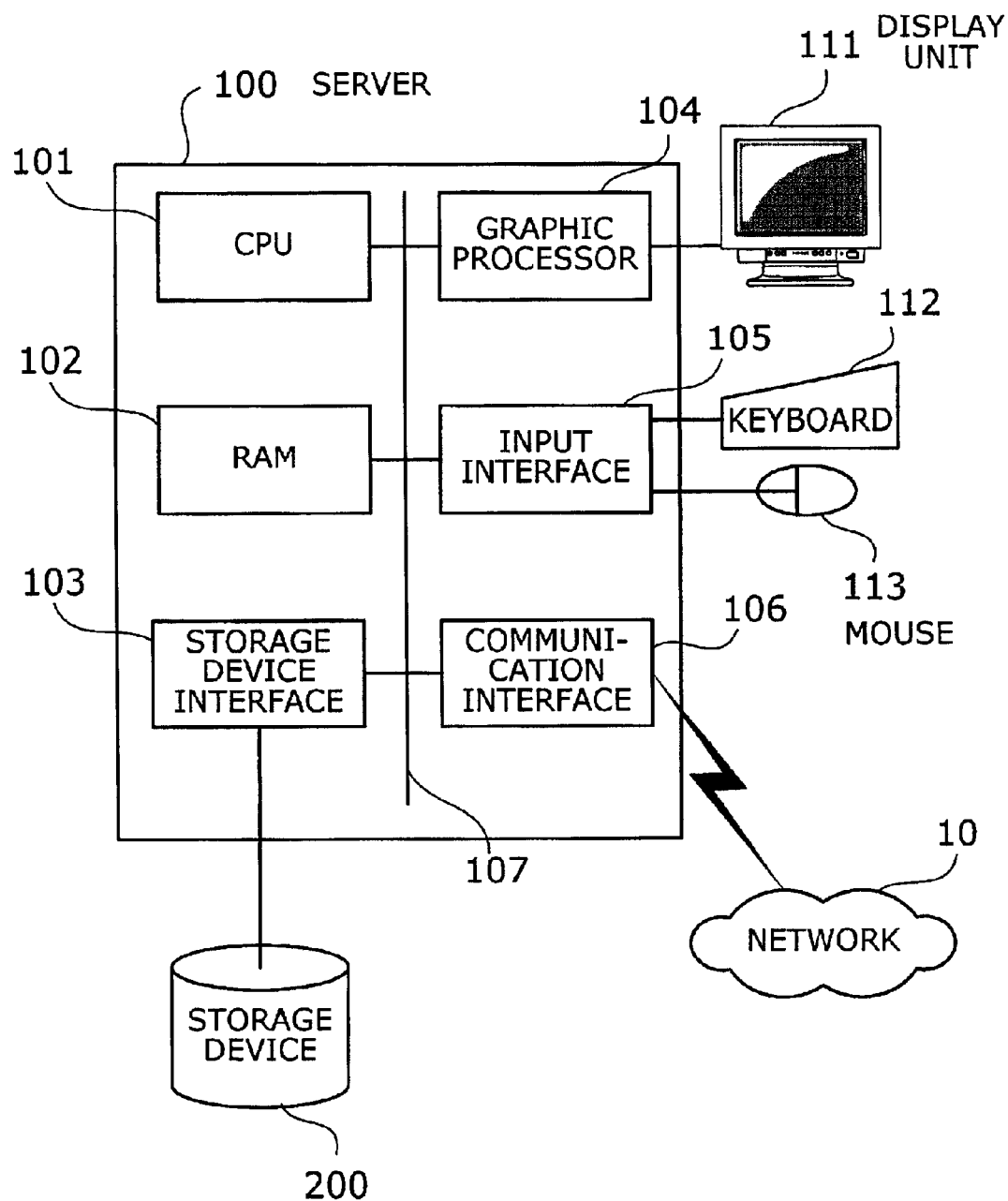
FIG. 3 is a block diagram of the hardware arrangement of a server used in the embodiment of the present invention.

FIG. 3 shows in block form the hardware arrangement of the server used in the embodiment of the present invention. As shown in FIG. 3, the server 100 is controlled in its entirety by a CPU 101. To the CPU 101, there are connected a RAM 102, a storage device interface 103, a graphic processor 104, an input interface 105, and a communication interface 106 through a bus 107.

The RAM 102 temporarily stores at least part of the program of an OS and application programs executed by the CPU 101. The RAM 102 also stores various data required in the processing operation of the CPU 101. The storage device interface 103 stores data into and reads data from the storage device 200 according to instructions from the CPU 101.

A display unit 111 is connected to the graphic processor 104. The graphic processor 104 displays an image on the screen of the display unit 111 according to an instruction from the CPU 101. A keyboard 112 and a mouse 113 are connected to the input interface 105, which transmits signals sent from the keyboard 112 and the mouse 113 via the bus 107 to the CPU 101.

The communication interface 106 is connected to the network 10, which is a wide area network such as the Internet, for example. The communication interface 106 transmits data to and receives data from other computers via the network 10.

The hardware arrangement described above makes it possible to perform processing functions in the embodiment of the present invention. While only the hardware arrangement of the server 100 has been described above, each of the clients 310, 320, 330 may be implemented by a similar hardware arrangement. With the clients 310, 320, 330 being hardware-implemented, a storage device for storing various programs including an OS and applications is connected to each of the clients 310, 320, 330.

Figure 4:
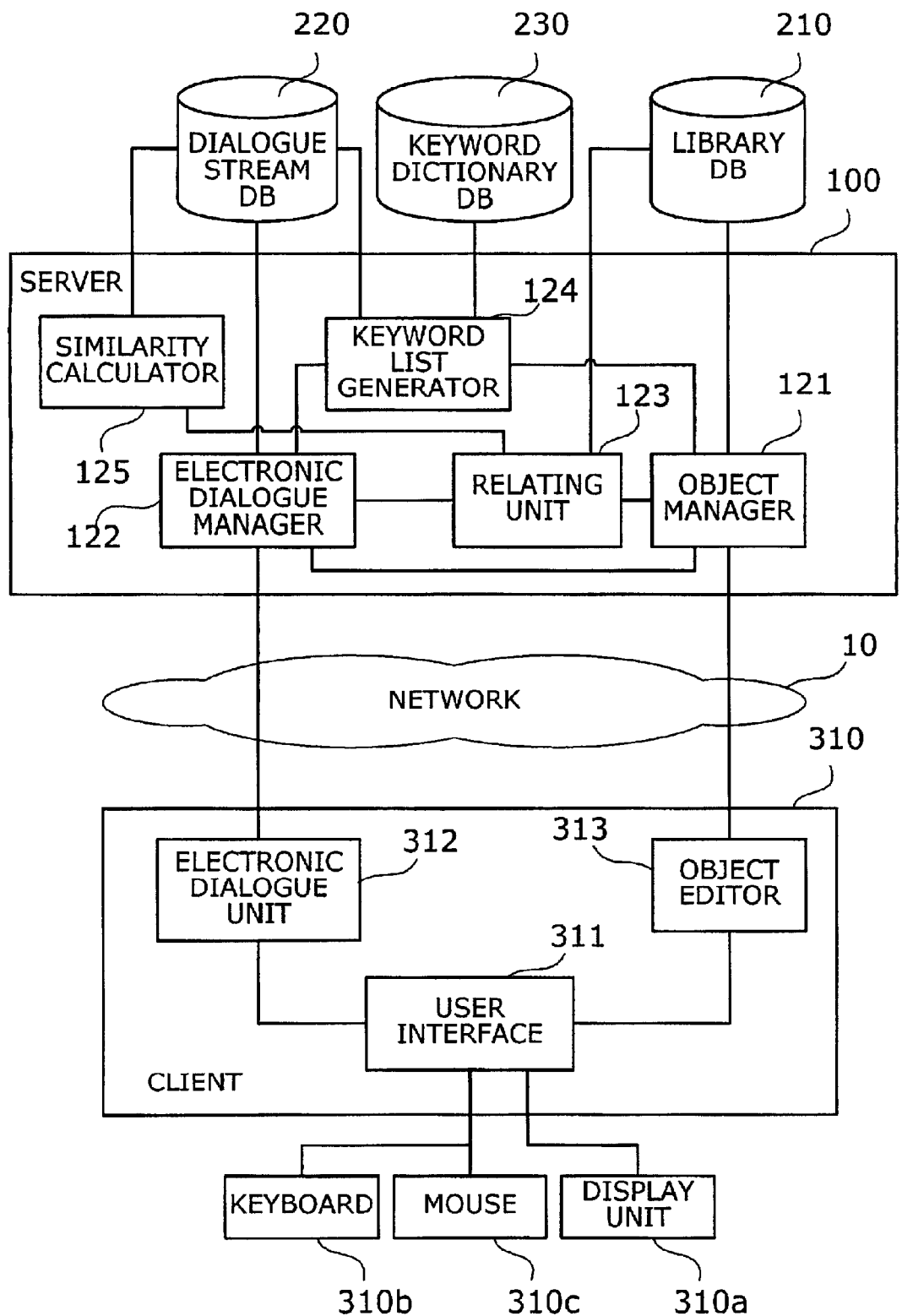
FIG. 4 is a functional block diagram showing processing functions used in the embodiment of the present invention.

FIG. 4 shows in functional block form processing functions in the embodiment of the present invention. In FIG. 4, the server 100 has as its functions an object manager 121, an electronic dialogue manager 122, a relating unit 123, a keyword list generator 124, and a similarity calculator 125.

The object manager 121 manages the storage of various objects into and the reading of various objects from the library DB 210 in response to requests from the client 310. When the content of an object stored in the library DB 210 is changed, the object manager 121 stores the changed object as a new object in the library DB 210. Therefore, the object manager 121 stores each object as a final fruit and also an editing history of the object as it is produced. When the object manager 121 stores an object into the library DB 210, if the object indicates a link between itself and a dialogue stream in the dialogue stream DB 220, then the object manager 121 transmits information as to the link to the relating unit 123.

The electronic dialogue manager 122 manages the transmission and reception of messages between clients, such as of teleconferences in a collaboration system. The electronic dialogue manager 122 stores messages transmitted and received between clients into the dialogue stream DB 220. If a message sent from the client 310 indicates a link to an object in the library DB, then the electronic dialogue manager 122 transmits information as to the link to the relating unit 123.

The relating unit 123 relates an object in the library DB 210 and a message (dialogue stream) in the dialogue stream DB 220 to each other based on the information as to the link which is transmitted from the object manager 121 or the electronic dialogue manager 122. Specifically, the relating unit 123 adds the identifying information (the storage location, the file name, etc) of the dialogue stream in the dialogue stream DB 220 to the object to be related in the library DB 210.

The keyword list generator 124 refers to the keyword dictionary DB 230 and generates a list of keywords contained in dialogue streams stored in the dialogue stream DB 220.

The similarity calculator 125 calculates a similarity between message documents which are not related, using information such as of receivers contained in speed documents stored in the dialogue stream DB 220.

The client 310 has a user interface 311, an electronic dialogue unit 312, and an object editor 313.

The user interface 311 generates an image based on image data transmitted from the electronic dialogue unit 312 and the object editor 313 and displays the generated image on a display unit 310a. The user interface 311 determines the content of a user's control input which has been entered using an input unit such as a keyboard 310b and a mouse 310c, and transmits a command depending on the entered user's control input to the electronic dialogue unit 312 and the object editor 313.

When the electronic dialogue unit 312 receives a command depending on a user's control input from the user interface 311, the electronic dialogue unit 312 generates a message to be transmitted to another client, and transmits the generated message to the server 100. The electronic dialogue unit 312 also receives a message from another client which is sent from the server 100, and sends image data for displaying the received message to the user interface 311.

When the object editor 313 receives a command depending on a user's control input from the user interface 311, the object editor 313 edits an object according to the received command. Furthermore, in response to a user's control input, the object editor 313 transmits a request to acquire an object stored in the library DB 210 managed by the server 100 and a request to store a new object into the library DB 210, to the server 100. When an object is transmitted from the server 100, the object editor 313 sends image data to display the object to the user interface 311.

While the functions of the client 310 among the plurality of clients have been described above with reference to FIG. 4, the functions of the other clients are the same as the above functions of the client 310.

Figure 5:
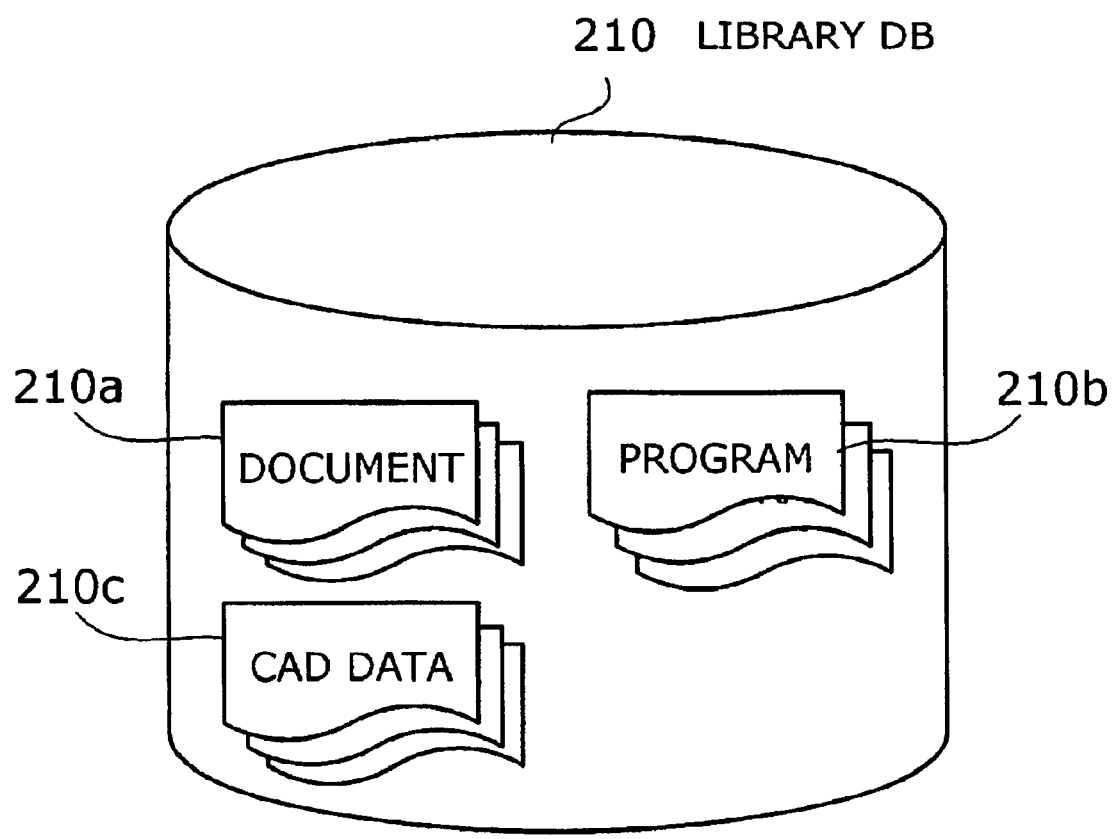
FIG. 5 is a block diagram of a library DB used in the embodiment of the present invention.

FIG. 5 shows in block form the library DB 210 used in the embodiment of the present invention. In FIG. 5, the library DB 210 stores objects 210a of documents (primarily composed of data of character codes) generated by such as a word processor, objects 210b of programs, and objects 210c of CAD data.

Figure 6:
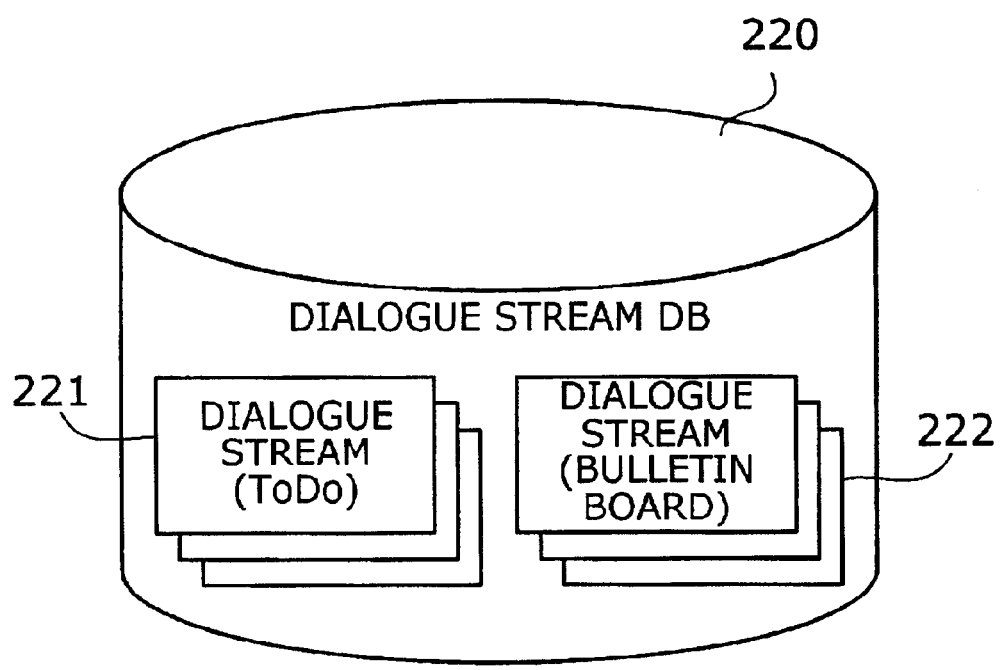
FIG. 6 is a block diagram of a dialogue stream DB used in the embodiment of the present invention.

FIG. 6 shows in block form the dialogue stream DB 220 used in the embodiment of the present invention. In FIG. 6, the dialogue stream DB 220 stores dialogue streams 221 of ToDo data and dialogue streams 222 of bulletin board data. The dialogue streams 221 of ToDo data are provided for respective business projects, and the dialogue streams 222 of bulletin board data are provided as data representing the contents of conversions in electronic bulletin boards for respective issues.

Figure 7:
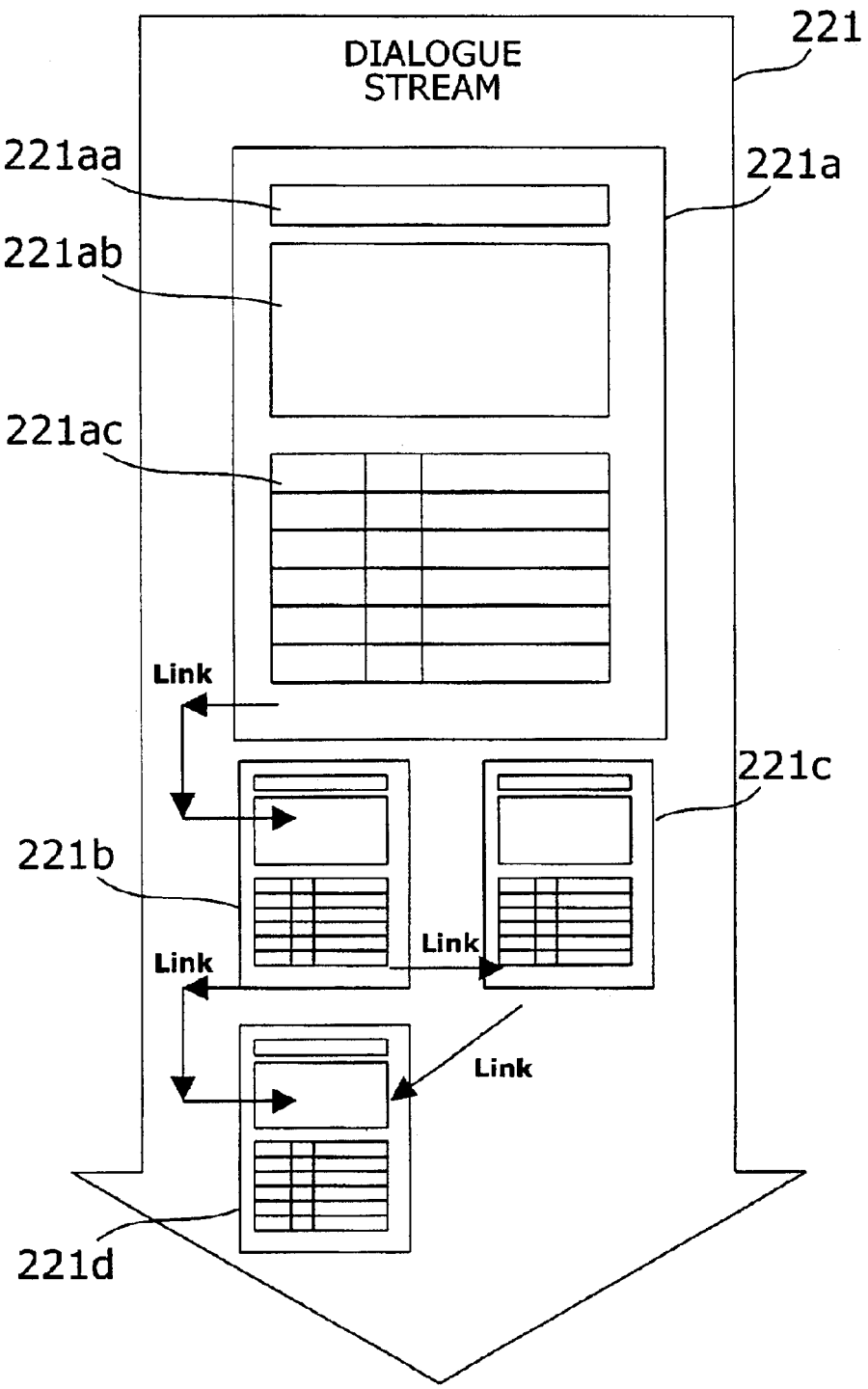
FIG. 7 is a diagram showing the concept of a dialogue stream.

FIG. 7 shows the concept of a dialogue stream 221. The dialogue stream 221 of ToDo data comprises a plurality of message documents 221a through 221d. The message documents 221a through 221d are related to each other such that a message document indicated as a source to relate itself to another message document and a message document indicated as a destination to be related to another message document are specified. Relating a certain message document to another message document is referred to as linking.

The message document 221a includes a bibliographical description 221aa, contents 221ab, and participant information 221ac. The bibliographical description 221aa includes a subject, an author, date information, etc. The contents 221ab represents character information of comments entered by aouthors. The participant information 221ac comprises information representing the names of participants, comments of participants, dates of messages made by participants, etc.

In the example shown in FIG. 7, the message document 221a is a message document at a highest level. The message document 221a is linked to the message document 221b, which is linked to the message documents 221c, 221d. The message document 221c is linked to the message document 221d.

[Basic Principles of the Knowledge Management System]

Operation of the knowledge management system thus constructed will be described below.

Figure 8:
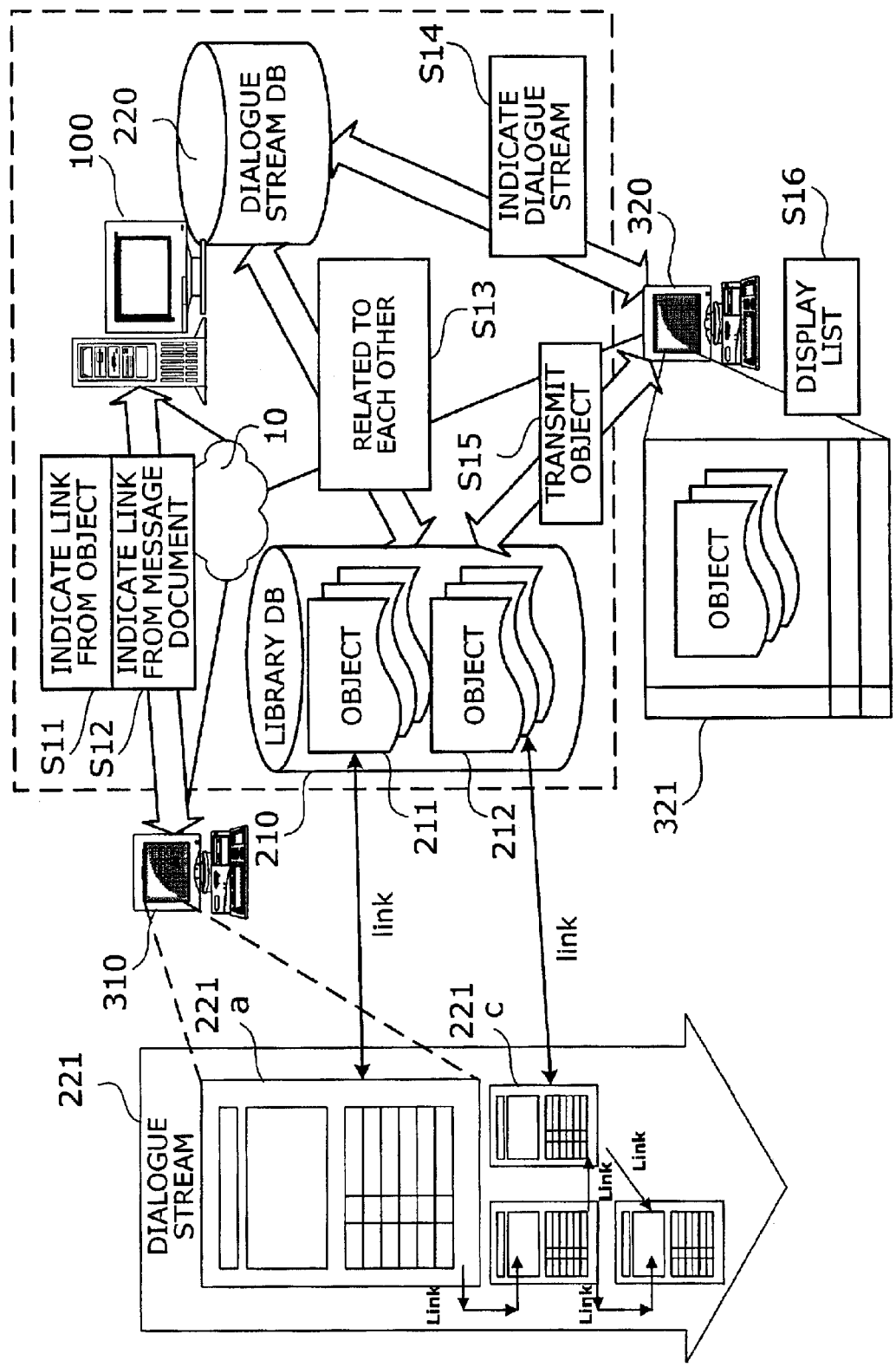
FIG. 8 is a diagram illustrative of a basic operation in the embodiment of the present invention.

FIG. 8 is illustrative of a basic operation of the knowledge management system in the embodiment of the resent invention. As shown in FIG. 8, the user who operates the client 310 indicates a link between an object in the library DB 210 and a message document in the dialogue stream DB 220.

For example, the user enters a control input to indicate an object to the client 310 and request the client 310 to register a new object. The user can include, in a request to register a new object, an instruction to generate a message document to be linked to the registered object. If an instruction to generate a message document is included in a request to register an object, then the client 310 outputs a request to register the object and a request to generate a message document linked to the registered object to the server 100 in STEP S11.

The user can also enter a control input into the client 310 to indicate a link from any desired message document stored in the dialogue stream 221 to any desired object. If a link from a message document to an object is specified by a user's control input, then the client 310 outputs a request to relate the message document to the object to the server 100 in STEP S12.

In response to the request from the client 310, the server 100 relates the message document in the dialogue stream DB 220 to the object in STEP S13. For example, when the server 100 receives a request to register the object and a request to generate a message document linked to the registered object from the client 310, the server 100 generates a new message document linked to an object to be registered, and registers an object linked to the generated message document in the library DB 210. When the server 100 receives a request to relate a message document to an object from the client 310, the server 100 establishes link information for the message document and the object, indicating each other as a link.

In the example shown in FIG. 8, the message document 221a of the dialogue stream 221 and an object 211 are linked to each other, and the message document 221c of the dialogue stream 221 and an object 212 are linked to each other.

The user who operates the client 320 can acquire an object related to any desired dialogue stream in the dialogue stream DB 220.

For example, in response to a control input from the user, the client 320 transmits a related information acquiring request which specifies any desired dialogue stream to the server 100 in STEP S14.

In response to the related information acquiring request, the server 100 reads an object linked to a message document in the specified dialogue stream from the library DB 210. Then, the server 100 transmits the read object to the client 320 in STEP S15. For example, if the related information acquiring request specifies the dialogue stream 221, the server 100 transmits the object 211 and the object 212 to the client 320.

Having received the objects, the client 320 displays a list of received objects 321 on the screen of its display unit in STEP S16.

In this manner, message documents in dialogue streams and objects can be related to each other. The library DB 210 contains objects that are referred to while businesses are being performed and objects that are produced while businesses are being performed. Therefore, it is possible to relate objects that are generated or referred to while businesses are being performed to message documents.

The basic operation shown in FIG. 8 will be described in specific detail below.

A process of simultaneously registering an object and linking the object and a dialogue stream to each other will be described below. In the present embodiment, the user can instruct a displayed object registration view to link a newly registered object and a dialogue stream to each other.

Figure 9:
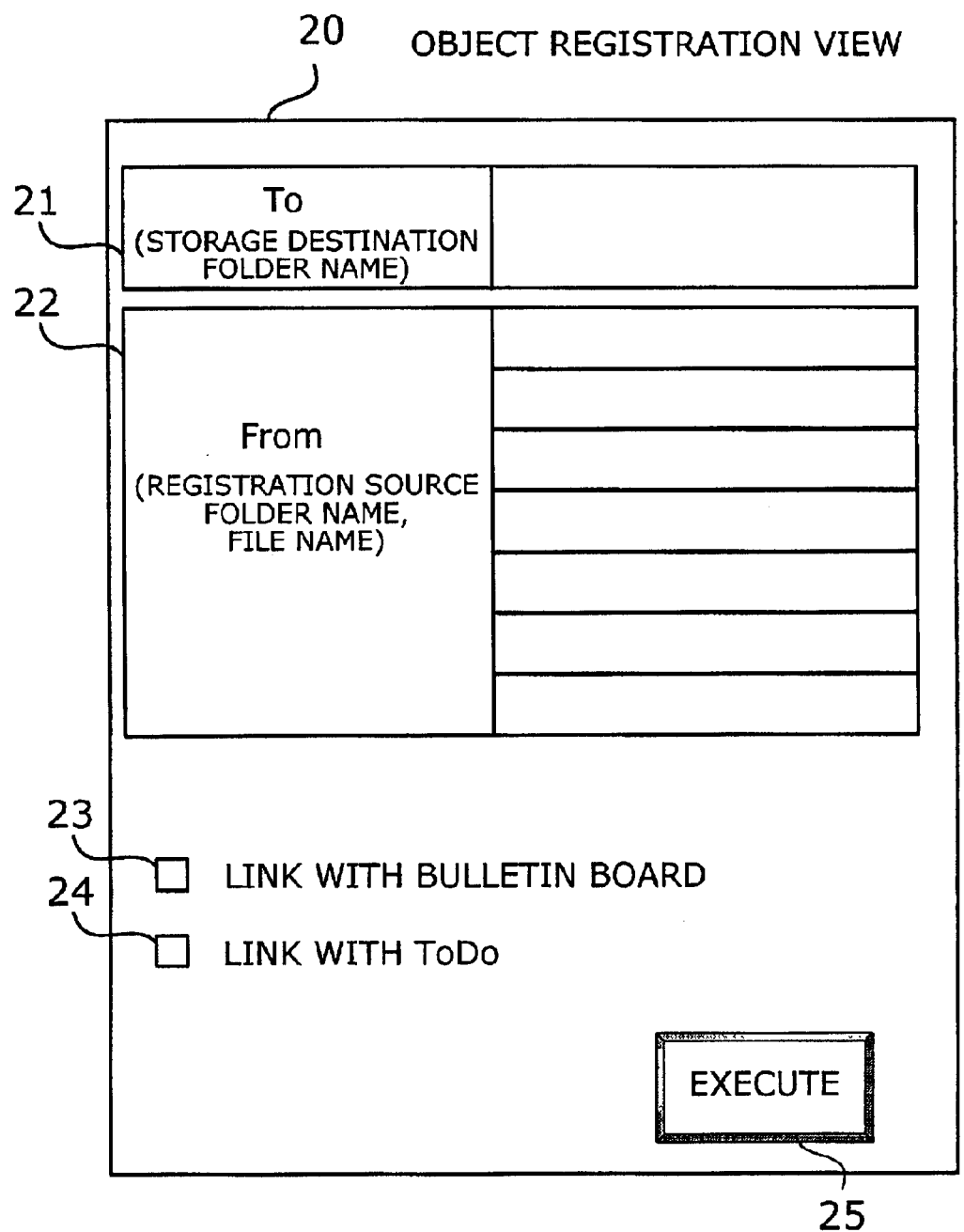
FIG. 9 is a view showing a displayed object registration view.

FIG. 9 shows a displayed object registration view by way of example. As shown in FIG. 9, a displayed object registration view 20 for registering a new object has a storage destination folder indicator 21 (To), a registration source object indicator 22 (From), a bulletin board linking check box 23, a ToDo linking check box 24, and an execute button 25.

The storage destination folder indicator 21 is used to set the folder name of a storage destination for an object to be newly registered. The registration source object indicator 22 is used to set the folder name of a folder where at least one object as a source to copy, therefrom, an object to be newly registered among objects already stored in the library DB 210, and the object name of that object.

The bulletin board linking check box 23 is a check box for indicating whether an object to be newly registered and a message document presented to a bulletin board are to be linked with each other or not. If the bulletin board linking check box 23 is checked, then a new message document presented to a bulletin board and an object to be newly registered are related to each other.

The ToDo linking check box 24 is a check box for indicating whether an object to be newly registered and a message document presented to ToDo are to be linked with each other or not. If the ToDo linking check box 24 is checked, then a new message document presented to ToDo and an object to be newly registered are related to each other.

Figure 11:
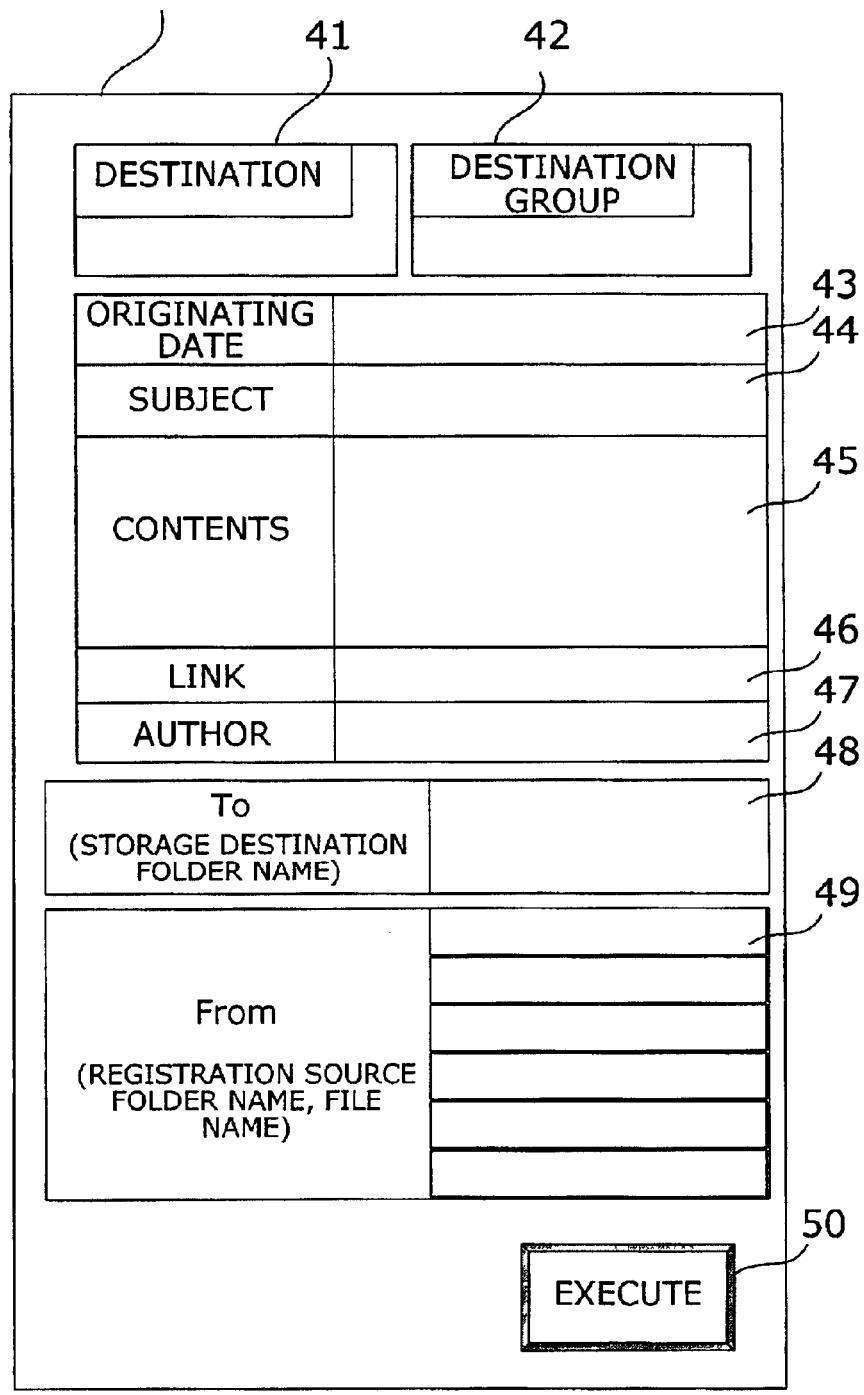
FIG. 11 is a view showing a displayed new message view for a dialogue stream.

The execute button 25 is a button for enabling the server 100 to execute a processing operation based on the contents of inputs entered in the displayed object registration view 20. When the execute button 25 is selected by a mouse pointer, the server 100 stores a copy of the object set in the registration source object indicator 22 into the folder set in the storage destination folder indicator 21. If the bulletin board linking check box 23 is checked at this time, then a dialogue stream using the bulletin board and linked with the object stored in the folder set in the storage destination folder indicator 21 is newly generated. Similarly, if the ToDo linking check box 24 is checked, then a dialogue stream using ToDo and linked with the object stored in the folder set in the storage destination folder indicator 21 is newly generated. The screen of the display unit of the client now displays a new message composition view as shown in FIG. 11.

By thus checking either one of the bulletin board linking check box 23 and the ToDo linking check box 24, the user can specify a link to be made between an object to be newly registered and a dialogue stream.

A process of linking a dialogue stream with an object registered in the library DB 210. In the present embodiment, an object to be linked can be selectively specified from among the list of objects registered in the library DB 210.

Figure 10:
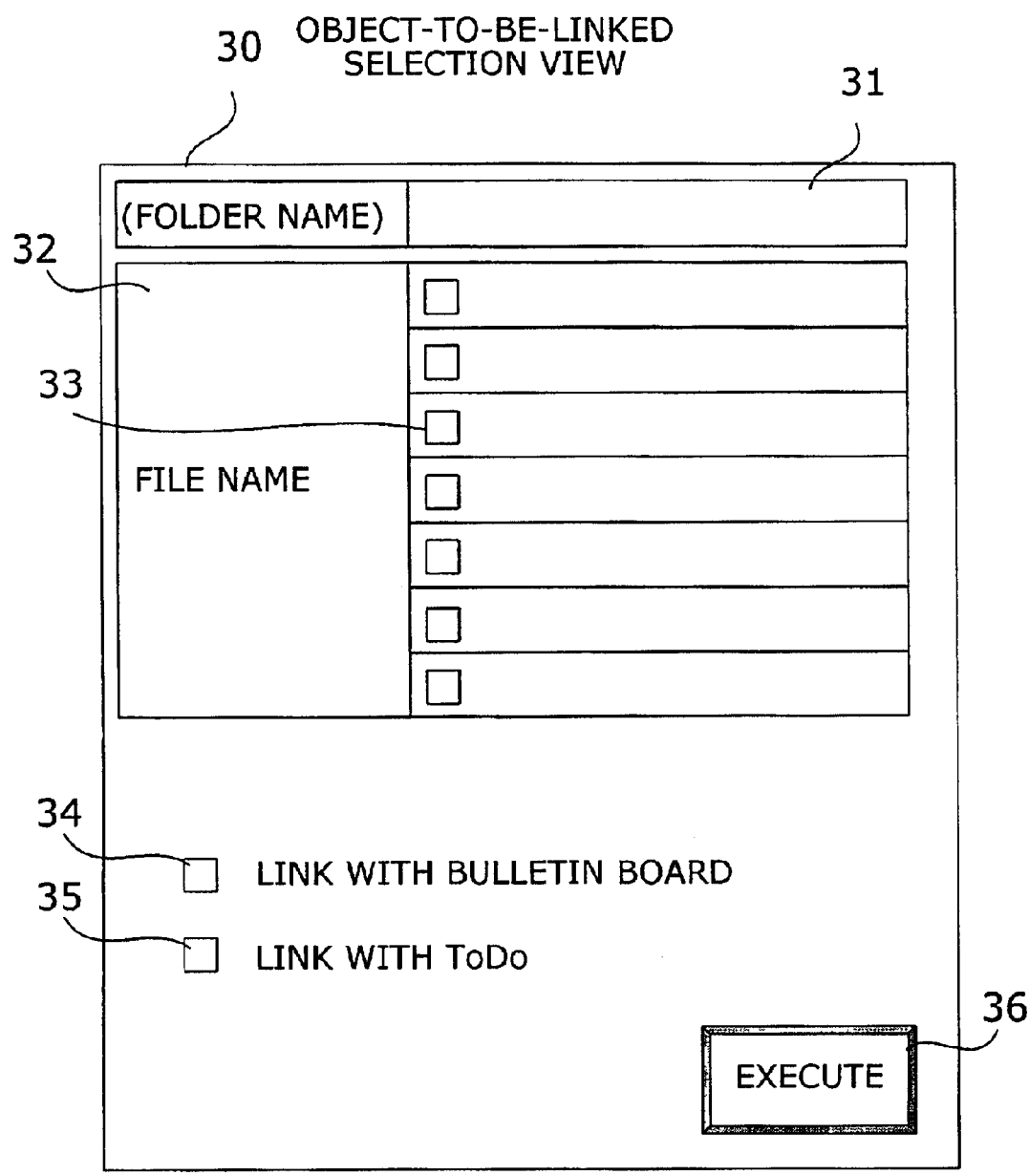
FIG. 10 is a view showing a displayed object-to-be-linked selection view.

FIG. 10 shows a displayed object-to-be-linked selection view. As shown in FIG. 10, a displayed object-to-be-linked selection view 30 has a folder name input box 31, a file name display box 32, a plurality of object selection check boxes 33, a bulletin board linking check box 34, a ToDo linking check box 35, and an execute button 36.

The folder name input box 31 is used to enter the folder (directory) name which stores an object to be linked. The file name display box 32 is used to display a list of files of objects (each object is stored in one file) in a folder represented by the folder name entered in the folder name input box 31. The object selection check boxes 33 are associated respectively with file names displayed in the file name display box 32.

The object selection check boxes 33 are check boxes for indicating whether objects under the corresponding file names are to be linked or not. If an object selection check box 33 is checked, then the object under the corresponding file name is to be linked.

The bulletin board linking check box 34 is a check box for indicating whether an object selected in the file name display box 32 and a message document presented to a bulletin board are to be linked with each other or not. If the bulletin board linking check box 34 is checked, then a new message document presented to a bulletin board and an object selected in the file name display box 32 are related to each other.

The ToDo linking check box 35 is a check box for indicating whether an object selected in the file name display box 32 and a message document presented to ToDo are to be linked with each other or not. If the ToDo linking check box 35 is checked, then a new message document presented to ToDo and an object selected in the file name display box 32 are related to each other.

The execute button 36 is a button for enabling the server 100 to execute a processing operation based on the contents of inputs entered in the displayed object-to-be-linked selection view 30. When the execute button 36 is selected, if the bulletin board linking check box 34 is checked, then a dialogue stream using the bulletin board and linked with the object under the file name selected in the file name display box 32 is newly generated. Similarly, if the ToDo linking check box 35 is checked, then a dialogue stream using ToDo and linked with the object under the file name selected in the file name display box 32 is newly generated.

By thus indicating an object which has already been registered, the user can specify a link between the specified object and a dialogue stream to be newly generated.

In the present embodiment, an object to be related may be specified in a displayed new message composition view for presenting a new message to a dialogue stream.

FIG. 11 shows, by way of example, a displayed new message composition view to which the displayed view shown in FIG. 9 changes when the ToDo linking check box 24 in the displayed view shown in FIG. 9 is selected and executed. As shown in FIG. 11, a displayed new message composition view 40 has a destination input box 41, a destination group input box 42, an originating date input box 43, a subject input box 44, contents input box 45, a link destination input box 46, an author input box 47, a storage destination folder indicator 48 (To), a registration source object indicator 49 (From), and an execute button 50.

The destination input box 41 is used to enter the destination of a party to which a message is to be transmitted. For example, the destination can be represented by the user name or e-mail address of a member of a project.

The destination group input box 42 is used to enter the group name of a group if a speed is to be transmitted to the parties belonging to the group. For example, if a message is to be transmitted to all the members of a certain project, then the group name already given to the project is entered in the destination group input box 42.

The originating date input box 43 is used to enter the date on which a message is to be transmitted. The subject input unit 44 is used to enter a desired subject which is briefly representative of the content of the message. The contents input box 45 is used to enter the specific content of the message.

If the message to be transmitted is to be related to another speed, then the link destination input box 46 is used to enter the subject of a message document to which the message to be transmitted is to be related. The list of message documents stored in the dialogue stream DB 220 may be displayed on the screen of the display unit, and when one of the message documents in the list is selected, the subject of the selected message document may be entered in the link destination input box 46.

The author input box 47 is used to enter the user name of the author.

The storage destination folder indicator 48 is used to set the folder name of a storage destination for an object to be related. The registration source object indicator 49 is used to set the folder name of a folder where at least one object as a source to copy, therefrom, an object to be related, and the object name of that object. At this time, the contents which have been set in the object registration view shown in FIG. 9 are displayed as being already entered.

If a new message composition is generated in relation to an existing object in the library DB 210, i.e., if the displayed view shown in FIG. 10 changes to a new message composition view when the ToDo linking check box 35 in the displayed view shown in FIG. 10 is selected, then the new message composition view displays the folder name input box 31 in place of the storage destination folder indicator 48 and the file name display box 32 in place of the registration source object indicator 49, with the contents which have been set in the displayed view shown in FIG. 10 being entered in the folder name input box 31 and the file name display box 32.

If a new message composition view is generated from the outset without previously indicating an object as shown in FIGS. 9 and 10, then storage destination folder indicator 48, the registration source object indicator 49, the folder name input box 31, and the file name display box 32 are displayed parallel to each other, and the user writes or specifies information in the corresponding input field depending on whether an object to be linked to the new message composition view has already been registered in the library DB 210.

The execute button 50 is a button for enabling the server 100 to execute a processing operation based on the contents of inputs entered in the new message composition view 40. When the execute button 50 is pressed, a message document having a destination entered in the destination input box 41 and transmission destinations representing the members of a group entered in the destination group input box 42 is stored in the dialogue stream DB 220. When the execute button 50 is pressed, if the folder name of a storage destination has been specified in the storage destination folder indicator 48 and an object as a registration source has been specified in the registration source object indicator 49, then a copy of the object as the registration source is stored in the folder as the storage destination. The object stored in the folder as the storage destination and the message document newly stored in the dialogue stream DB 220 are related to each other.

When the author is to correct the content of the message, the author uses the client to read the message document stored in the dialogue stream DB 220 in the server 100. The screen of the display unit of the client then displays the view shown in FIG. 11 with previous message data entered therein. The author uses the client to edit (correct) the message document as desired, and the client stores the edited message document into the dialogue stream DB 220 in the server 100. In this manner, the message document is edited or corrected.

The speed document stored in the dialogue stream DB 220 by the speaker can be read by the client of a user which has been specified as a destination. The client which has read the message document displays a comment registration view.

Figure 12:
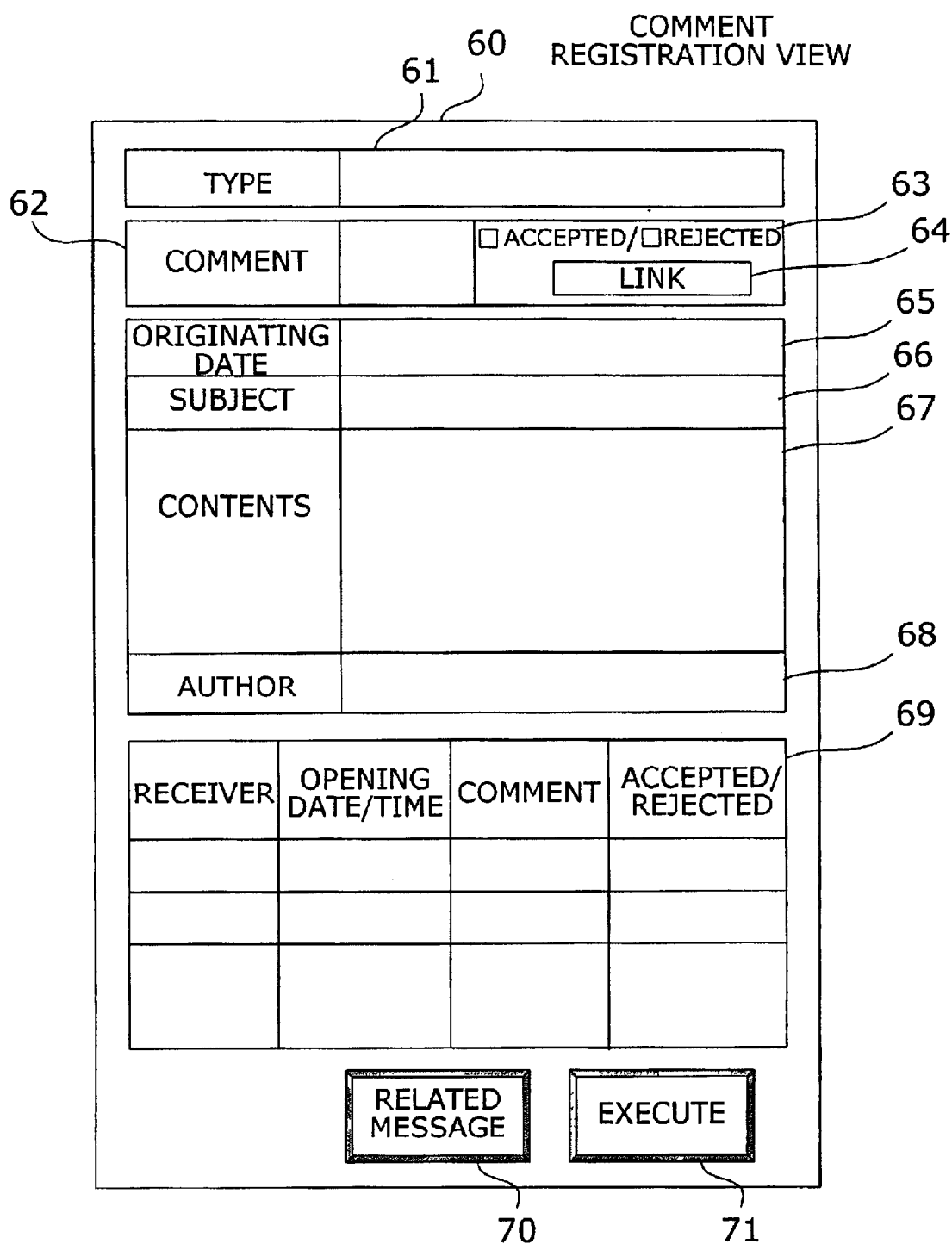
FIG. 12 is a view showing a displayed comment registration view.

FIG. 12 shows by way of example a displayed comment registration view. As shown in FIG. 12, a displayed comment registration view 60 has a type display box 61, a comment input box 62, an acceptance/rejection check box 63, a link button 64, an originating date display box 65, a subject display box 66, contents display box 67, an author display box 68, a receiver data display box 69, a related message button 70, and an execute button 71.

The type display box 61 displays the type of a message which represents the purpose thereof. Message types include a notice (disclosing information), a message (transmitting information), a due date (transmitting information regarding the management of a schedule), etc.

The comment input box 62 is used to enter a comment given to a message by the receiver. The acceptance/rejection check box 63 is a check box for indicating the intent of the receiver about whether the content of a message is accepted or rejected. If "ACCEPTED" is checked, then it means that the content of a message is accepted, and if "REJECTED" is checked, then it means that the content of a message is not accepted.

The link button 64 is a button for linking (relating) an object to the message document which is being specified. When the link button 64 is pressed, a link indicating auxiliary view is displayed.

The originating date display box 65 displays the originating date of the message document which is being specified. The subject display box 66 displays the subject of the message document which is being specified. The contents display box 67 displays the contents of the message document which the author has entered. The contents displays therein an object name related to the message view. Since the object name is hyperlinked, the object is automatically unfolded when it is selected. The author display box 68 displays the user name of an author who has registered the message document.

The receiver data display box 69 displays a table of data of receivers who have received the message document. The receiver data display box 69 has columns of receivers, opening dates/times, comments, and accepted/rejected statuses.

The column of receivers displays the user names of users (receivers) who have been specified as destinations of the message document. The column of opening dates/times displays dates and times when receivers have opened the message document, i.e., when the clients have displayed the message document on their display unit screens. The column of comments displays comments which receivers entered in the comment input box 62 of their comment registration views. The column of accepted/rejected statuses displays whether receivers have accepted or rejected the message document.

The related message button 70 is a button for making a message related to the displayed message. When the related message button 70 is pressed, a new message document, to which the displayed message document is linked, is generated. The client displays a new message composition view of the generated message document.

The execute button 71 is a button for enabling the server 100 to execute a processing operation based on the contents of inputs entered in the comment registration view 60. Specifically, the comment entered in the comment input box 62 is registered as the receiver's comment in the message document, and the accepted/rejected status indicated in the acceptance/rejection check box 63 is registered as the receiver's judgement in the message document.

Figure 13:
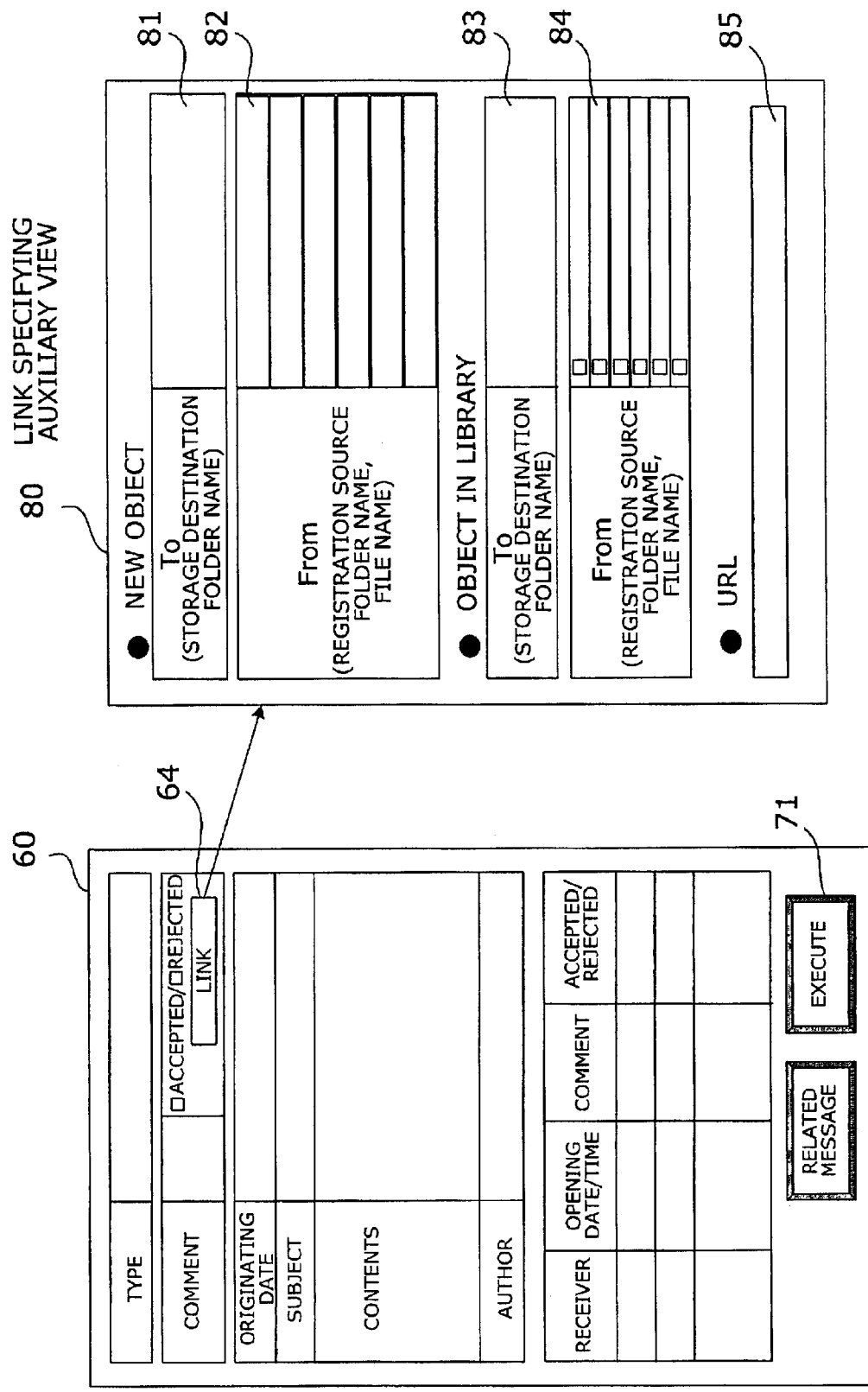
FIG. 13 is a view showing a link indicating auxiliary view which is displayed when a link button in the comment registration view is pressed.

FIG. 13 shows a link indicating auxiliary view which is displayed when the link button in the comment registration view is pressed. Specifically, when the link button 64 in the comment registration view 60 is pressed, a link specifying auxiliary view 80 shown in FIG. 13 is displayed. As shown in FIG. 13, the link specifying auxiliary view 80 has a storage destination folder indicator 81 (To), a registration source object indicator 82 (From), a folder name indicator 83, a file name indicator 84, and an URL (Uniform Resource Locator) input box 85.

The storage destination folder indicator 81 and the registration source object indicator 82 are used to relate an object which has not been registered in the library DB 210 to the comment registration view 60. The folder name of a folder for storing the object is entered in the storage destination folder indicator 81. The folder name of a folder where at least one object as a source to copy, therefrom, an object to be related to the message document, and the object name of that object are set in the registration source object indicator 82.

The folder name indicator 83 and the file name indicator 84 are used to relate an object already registered in the library DB 210 to the comment registration view 60. The folder (directory) name of a folder in the library DB 210 where an object to be linked is stored is entered in the folder name indicator 83. A list of files of the object in the folder indicated in the folder name indicator 83 is displayed in the file name indicator 84, and the user selects selection check boxes associated with the respective files to specify necessary files.

The URL input box 85 is used to enter the URL of the object to be related to the comment registration view 60 if the object represents contents within a contents server, i.e., a device for providing contents to other computers, which is connected via a network such as the Internet or the like.

After various objects have been specified in the link specifying auxiliary view 80 shown in FIG. 13, and when the execute button 71 in the comment registration view 60 is pressed, the linking to those objects is completed.

As described above with reference to FIGS. 9 through 13, there are roughly three types of instructions to link an object and a message document in a dialogue stream to each other. According to the first type, a message document to be linked to is indicated from an object. According to the second type, the author of a message document indicates an object to be linked to the message document. According to the third type, the receiver of a message document indicates an object to be linked to the message document which has been received. A process of relating an object and a message document to each other in the server 100 for each of these types of linking instructions will be described below.

Figure 14:
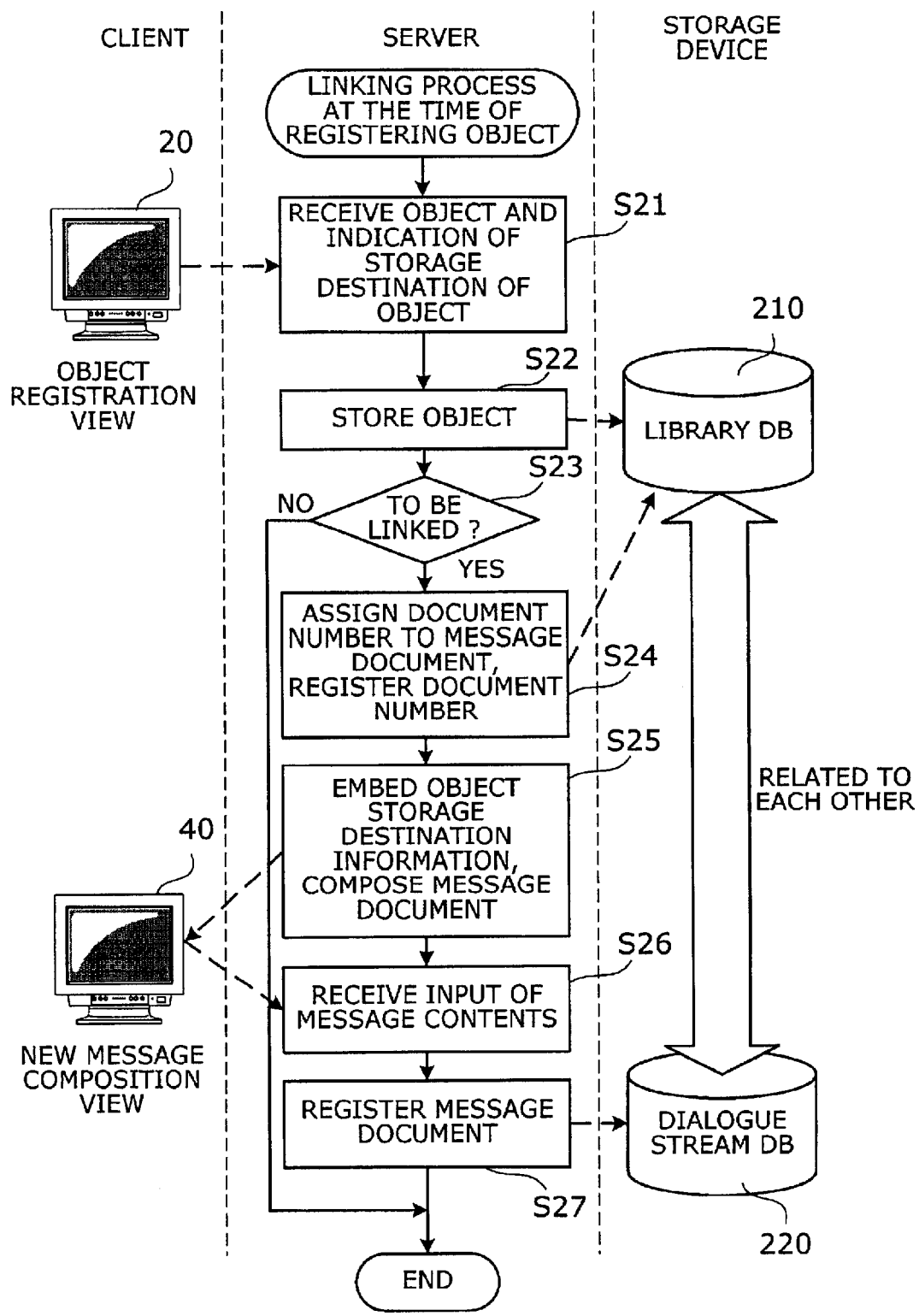
FIG. 14 is a flowchart of a linking process at the time of registering an object.

FIG. 14 is a flowchart of a linking process at the time of registering an object. The linking process shown in FIG. 14 will be described below successively with respect to step numbers therein.

[STEP S21] The server 100 accepts an object and an indication of a storage destination for storing the object, which are sent from the client 310. Specifically, the object editor 313 displays the object registration view 20 on the display unit screen of the client 310. The user of the client 310 enters an object to be related and a storage destination for storing the object in the object registration view 20. The object editor 313 transmits a copy of the object to be related and information of the storage destination for storing the object to the server 100. In the server 100, the object manager 121 receives the copy of the object to be related and the information of the storage destination for storing the object, which are sent from the client 310.

[STEP S22] The server 100 stores the object to be related into the library DB 210. Specifically, the object manager 121 stores the received copy of the object to be related into the storage destination folder in the library DB 210.

[STEP S23] The server 100 determines whether there is an indication to link the object to a message document in registering the object or not. If there is a linking indication, then control goes to STEP S24. If there is no linking indication, then the processing operation is put an end.

Specifically, if the bulletin board linking check box 23 in the object registration view 20 displayed on the client 310 is checked, then a bulletin board linking indication is sent from the object editor 313 in the client 310 to the object manager 121 in the server 100. Similarly, if the ToDo linking check box 24 in the object registration view 20 is checked, then a ToDo linking indication is sent from the object editor 313 in the client 310 to the object manager 121 in the server 100. When the object manager 121 receives a linking indication (a bulletin board linking indication or a ToDo linking indication), the object manager 121 transfers the linking indication to the relating unit 123, which then starts a relating process from STEP S24.

[STEP S24] The server 100 assigns a message number to a message to be newly generated, and registers the message number in relation to the object registered in STEP S22. Specifically, the object manager 121 asks the electronic dialogue manager 122 to newly generate a message document. The electronic dialogue manager 122 generates a new message document, and assigns a message number to the message document, i.e., assigns a document number to the message document in order to uniquely identify the message document. The assigned document number is transmitted to the relating unit 123. The relating unit 123 registers the assigned document number in the library DB 210 in relation to the object which has been stored by the object manager 121 in STEP S22.

[STEP S25] The server 100 composes a message document where object storage destination information is embedded. Specifically, the relating unit 123 embeds object storage destination information, i.e., the folder name of a storage destination folder and the file name of the object, in the message document which has been generated by the electronic dialogue manager 122 in STEP S24. The electronic dialogue manager 122 transmits a request to enter contents in the message document where the object storage destination information is embedded, to the client 310.

The client 310 which has received the request to enter contents displays the new message composition view 40 on the display unit 310a via the user interface 311.

[STEP S26] The server 100 receives an input of message contents from the client 310. Specifically, the electronic dialogue unit 312 in the client 310 transmits message information representing a subject, contents, a destination, etc. which have been entered in the new message composition view 40 to the server 100. In the server 100, the electronic dialogue manager 122 receives the transmitted message information.

[STEP S27] The server 100 registers the message document in the dialogue stream DB 220. Specifically, the electronic dialogue manager 122 embeds the message information received in STEP S26 in the message document composed in STEP S25. The electronic dialogue manager 122 then stores the message document into the dialogue stream DB 220. Thereafter, the processing operation is ended.

In this manner, the object registered in the library DB 210 in STEP S22 and the message document stored in the dialogue stream DB 220 in STEP S27 are related to each other.

There are instances where an object registered in the library DB 210 is specified and a message document related to the object is generated. In such a case, the user of the client 310 enters certain information into the displayed object-to-be-linked selection view 30 shown in FIG. 10. The entered information is sent to the server 100 by the object editor 313. The server 100 then executes the processing in STEP S24–STEP S27, thus relating the registered object to a message document that is newly generated.

A linking process at the time the author of a message document indicates an object to be linked to the message document will be described below.

Figure 15:
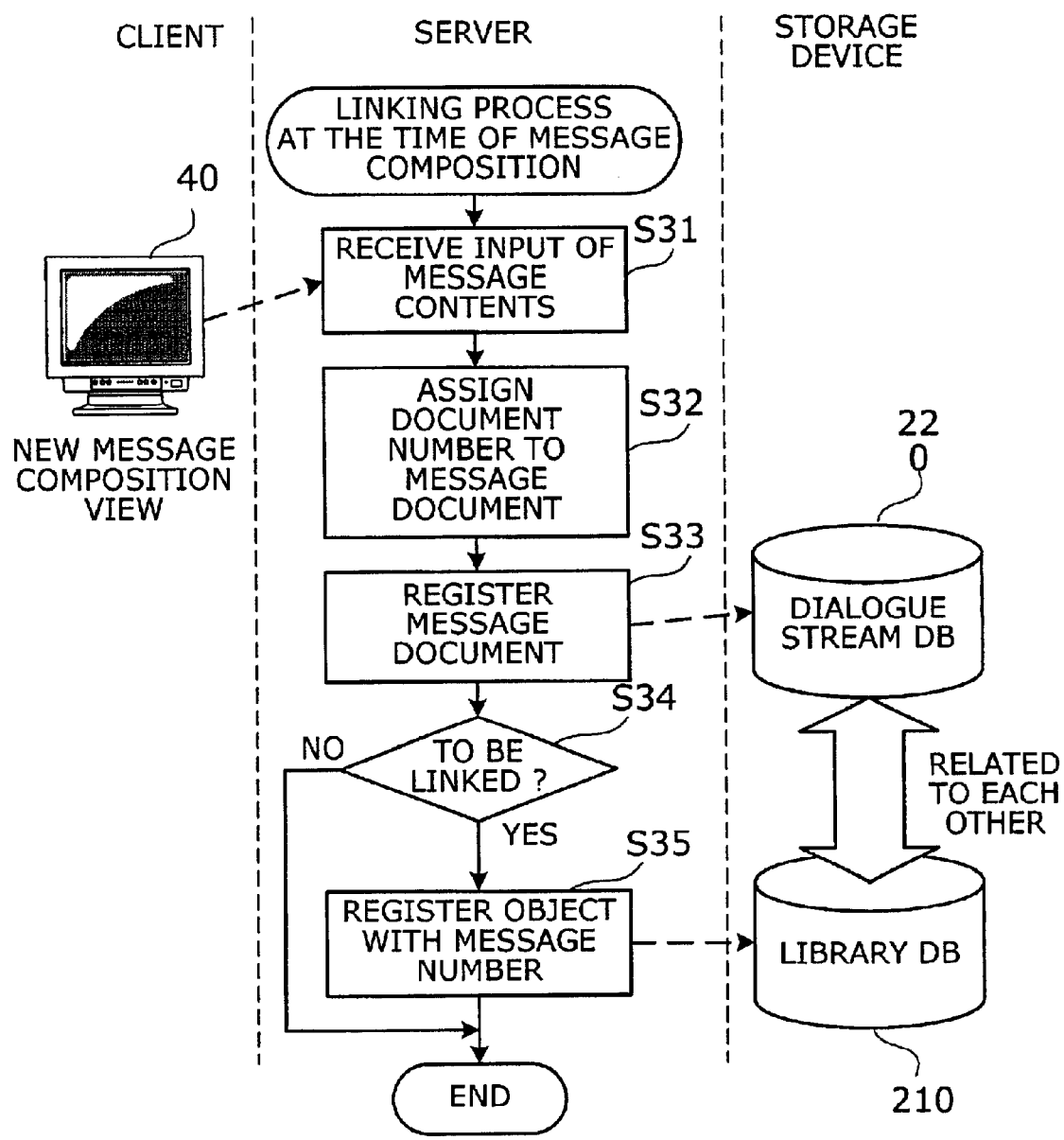
FIG. 15 is a flowchart of a linking process at the time of message composition.

FIG. 15 shows a linking process at the time of message composition. The linking process shown in FIG. 15 will be described below successively with respect to step numbers therein.

[STEP S31] The server 100 receives an input of message contents from the client 310. Specifically, information which the user has entered in the new message composition view 40 of the client 310 is sent from the electronic dialogue unit 312 in the client 310 to the server 100. If an object to be related is a newly registered object, then a copy of the object is also sent from the electronic dialogue unit 312 to the server 100. In the server 100, the transmitted information is received by the electronic dialogue manager 122.

[STEP S32] The electronic dialogue manager 122 composes a new message document and assigns a document number to the composed message document.

[STEP S33] The electronic dialogue manager 122 registers the composed message document in the dialogue stream DB 220. If the information received in STEP S31 includes information of an object to be related, i.e., a storage destination folder name, a registration source folder name, an object file name, etc., if an object to be related is a newly registered object, and a registered folder name and object file name if an object to be related is an already registered object, then the message document is stored in a format including information of an object to be related.

[STEP S34] The server 100 determines whether there is a link to be established between the composed message document and the object. If there is a link to be established, then control goes to STEP S35. If there is no link to be established, then the processing operation is put an end. Specifically, the electronic dialogue manager 122 judges that a link is to be established if the information from the client 310 includes information of an object to be linked, and judges that a link is not to be established if the information from the client 310 includes no information of an object to be linked.

[STEP S35] The server 100 registers an object with a message number in the library DB 210. Specifically, if the object is a newly registered object, the object manager 121 stores a copy of the received object in a storage destination folder in the library DB 210. The relating unit 123 assigns the document number assigned in STEP S31 to the object stored by the object manager 121. If the related object is registered in the library DB 210, then a document number is newly added and assigned.

In this manner, an object can be related to a newly generated message document.

A linking process in which the receiver of a message document specifies an object to be linked to the message document at the time the receiver enters a comment on the received message document will be described below.

Figure 16:
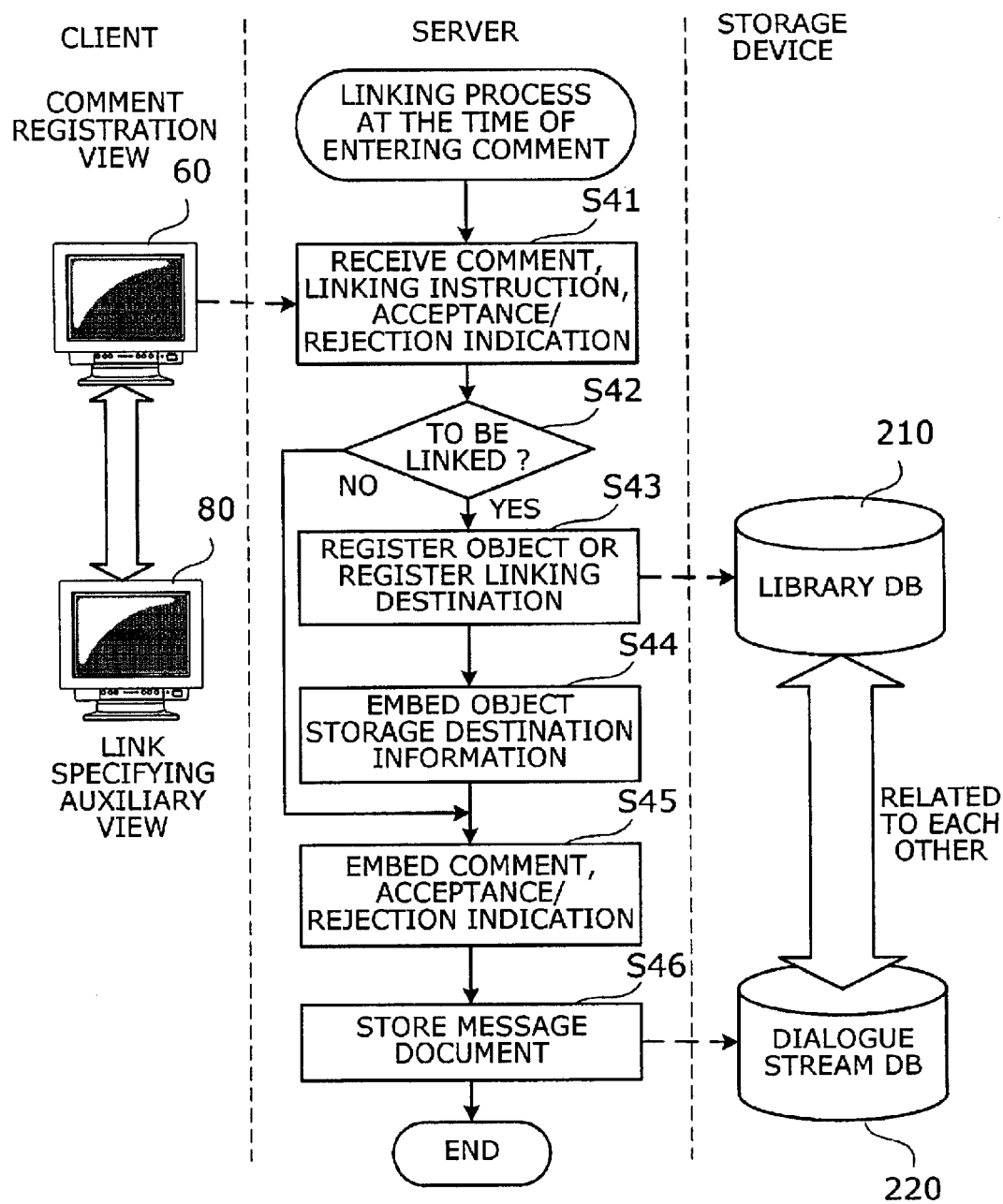
FIG. 16 is a flowchart of a linking process at the time of entering a comment from a receiver.

FIG. 16 shows a linking process at the time of entering a comment from a receiver. The linking process shown in FIG. 16 will be described below successively with respect to step numbers therein.

[STEP S41] The server 100 receives a comment, a liking instruction, and an acceptance/rejection indication about a certain message document from the client 310. Specifically, information entered in the comment registration view 60 and the link specifying auxiliary view 80 on the client 310 is transmitted from the electronic dialogue unit 312 in the client 310 to the server 100. The information transmitted from the electronic dialogue unit 312 is received by the electronic dialogue manager 122 in the server 100.

[STEP S42] The electronic dialogue manager 122 determines whether there is a linking instruction in the information transmitted from the client 310 or not. If there is a linking instruction, then control goes to STEP S43. If there is no linking instruction, then control goes to STEP S45.

[STEP S43] The server 100 registers an object or a link destination in the library DB 210 according to the linking instruction. For example, if a link to a Web page on the Internet or an intranet is specified by way of an URL, then the server 100 registers linking information for the URL. Specifically, the electronic dialogue manager 122 sends a request to register an object or a linking destination according to the linking instruction to the object manager 121. In response to the request, the object manager 121 registers an object or a linking destination in the library DB 210. At this time, the relating unit 123 relates the object or the linking destination registered in the library DB 210 to the message document on which the comment has been entered in STEP S41.

[STEP S44] The relating unit 123 embeds object storage destination information in the message document.

[STEP S45] The electronic dialogue manager 122 embeds the information of the comment, the acceptance/rejection indication, etc. which has been received in STEP S41, into the message document.

[STEP S46] The electronic dialogue manager 122 stores the message document into the dialogue stream DB 220.

Therefore, an object can be related to a message document even from a client which has received the message document.

By thus relating a dialogue stream and an object, the object can easily be reused for improved business efficiency. Processes of reusing objects based on the relationship between dialogue streams and the objects will be described below.

[Object Retrieval Using a Dialogue Stream]

Information about relating a dialogue stream to an object can be used to retrieve the object. An object such as CAD data may not contain character information. If CAD data does not contain character information, then it is difficult to find desired CAD data according to keyword-based retrieval. However, the retrieval of objects based on the contents of message documents related to the objects makes it possible to perform keyword-based retrieval of an object which does not contain character information. Such a keyword-based retrieval process will be described below.

Figure 17:
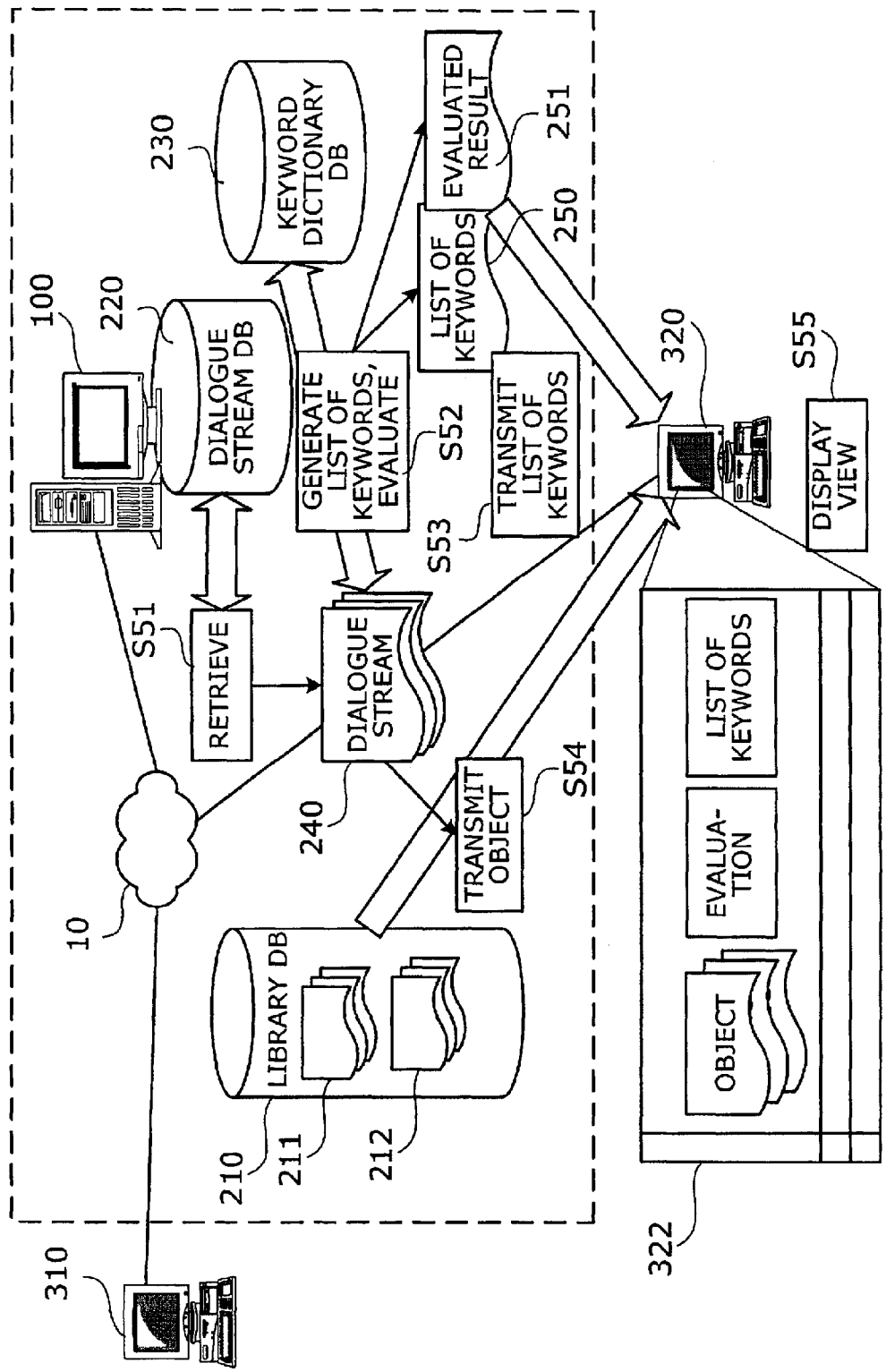
FIG. 17 is a diagram showing the concept of an object retrieval process using a dialogue stream.

FIG. 17 shows the concept of an object retrieval process using a dialogue stream. In FIG. 17, an object retrieval process is carried out based on retrieval conditions given from the user of the client 320, and a list of objects as a retrieved result and information as to the technical background of the objects are provided to the user.

When the client 320 gives a retrieval request based on a combination of keywords to the server 100, the server 100 performs a keyword-based retrieval process on individual dialogue streams in the dialogue stream DB 220 in STEP S51. As a retrieved result, dialogue streams 240 are acquired.

The server 100 refers to the keyword dictionary DB 230, generates a list 250 of keywords contained in the dialogue streams 240, and evaluates the dialogue streams 240 in STEP S52. To the keyword list 250, there is added information representing the frequency of appearance in the message documents of technical terms (process names, etc.) contained in the dialogue streams 240. The server 100 also evaluates each of the dialogue streams based on the matching between the keywords in the retrieval condition and the keywords in the dialogue stream 240. The server 100 transmits the generated keyword list 250 and an evaluated result 251 to the client 320 in STEP S53. the server 100 acquires objects related to the dialogue streams 240 extracted as the retrieved result from the library DB 210, and transmits the acquired objects to the client 320 in STEP S54.

The client 320 displays a retrieved result view 322 in STEP S55. The retrieved result view 322 includes objects, an evaluation, and a keyword list.

Since objects and message documents in dialogue streams are related to each other, an object which does not contain characters can be retrieved according to the keyword-based retrieval process. As a list of technical terms related to the detected object is displayed, it is possible for the user to guess the field of the object without a detailed analysis of the content of the object.

For example, if there is a system proposal (object) produced when a computer system was delivered to a financial organization, then when the background information of the object is acquired, many computer terms and financial terms appear as a list of keywords. The list of keywords allows the user to easily guess that the system proposal is a proposal for a computer system designed for financial organizations.

Figure 18:
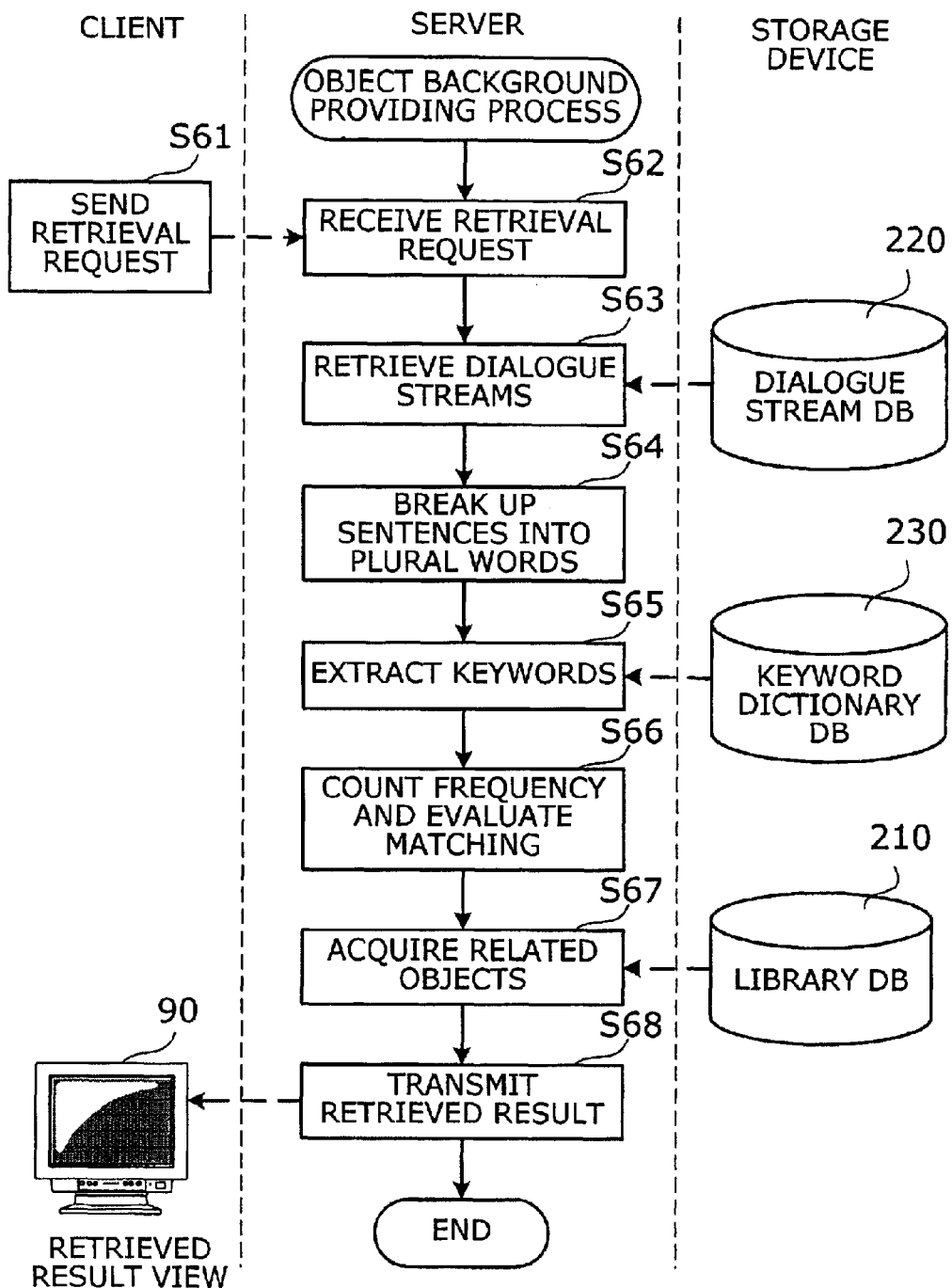
FIG. 18 is a flowchart of a sequence of the object retrieval process using a dialogue stream.

FIG. 18 is a flowchart of a sequence of the object retrieval process using a dialogue stream. The object retrieval process shown in FIG. 18 will be described below successively with respect to step numbers therein.

[STEP S61] The client 320 sends a retrieval request to the server 100.

[STEP S62] The server 100 receives the retrieval request from the client 320.

[STEP S63] In response to the retrieval request, the electronic dialogue manager 122 searches the dialogue streams in the dialogue stream DB 220 and acquires dialogue streams 240 containing keywords included in the retrieval request from the dialogue stream DB 220. The acquired dialogue streams 240 are transferred to the keyword list generator 124 in the server 100.

[STEP S64] The keyword list generator 124 breaks up sentences (contents, receiver's comments, etc.) contained in the acquired message documents according to a morphemic analysis or the like, and extracts a plurality of words therefrom.

[STEP S65] The keyword list generator 124 refers to the keyword dictionary DB 230 and extracts keywords registered in the keyword dictionary DB 230 from among the words generated in STEP S64.

[STEP S66] The keyword list generator 124 counts the frequency of appearance of keywords contained in all the message documents that have been acquired. Then, the keyword list generator 124 generates a keyword list. The generated keyword list contains information about the frequency of appearance of keywords.

The keyword list generator 124 evaluates the matching of each of the dialogue streams from the matching between the keywords indicated in the retrieval condition and the keywords extracted from the dialogue stream.

[STEP S67] The object manager 121 acquires objects related to the message documents of the dialogue streams extracted as the retrieved result, from the library DB 210.

[STEP S68] The object manager 121 generates retrieved result data from the keyword list and the evaluated result which have been generated by the keyword list generator 124 and the objects acquired in STEP S67. The object manager 121 transmits the retrieved result data to the client 320, which displays a retrieved result view 90.

FIG. 19 shows the retrieved result view 90 by way of example. The retrieved result view 90 has an object (document name) display column 91, an evaluation display column 92, and a process/technique list display column 93.

The object display column 91 displays the object names of objects related to dialogue streams for the respective dialogue streams extracted by the retrieval process. The evaluation display column 92 displays an evaluation indicative of a matching with the retrieval condition for each of the respective dialogue streams extracted by the retrieval process. For example, such a evaluation can be specified in one of three stages. In the example shown in FIG. 19, the evaluation display column 92 displays "A" if the evaluation is high, "B" if the evaluation is not high, and "C" if the evaluation is low.

The process/technique list display column 93 displays a list of keywords contained in message documents related to the objects displayed in the object display column 91. Each of the keywords is followed by its count, in parentheses, of appearance within the message documents.

The user of the client 320 can thus acquire a list of keywords contained in the description in the message documents (or dialogue streams) related to the objects, together with the frequency of appearance of the keywords. Thus, the information relative to the technical background of the objects is presented to the user.

In the above example, the information in dialogue streams is searched and objects related to detected dialogue streams are acquired. Conversely, however, objects may first be searched and dialogue streams related to detected objects may be acquired. These retrieval functions may be performed independently or in relation to each other, allowing the user to obtain information in various aspects.

[Providing Related Dialogue Candidates]

In the above description, an object indicated as desired by the user and a message document are related to each other. If, however, the amount of information in the dialogue stream DB 220 becomes very large, then another dialogue stream may be generated to solve a problem similar to a certain dialogue stream. In such a case, it is necessary to indicate the existence of a dialogue stream for solving the same problem to the user by some means. The knowledge management system according to the present embodiment has a function to judge a similarity of the content of a dialogue stream and present an evaluated value of the similarity to the user.

Figure 20:
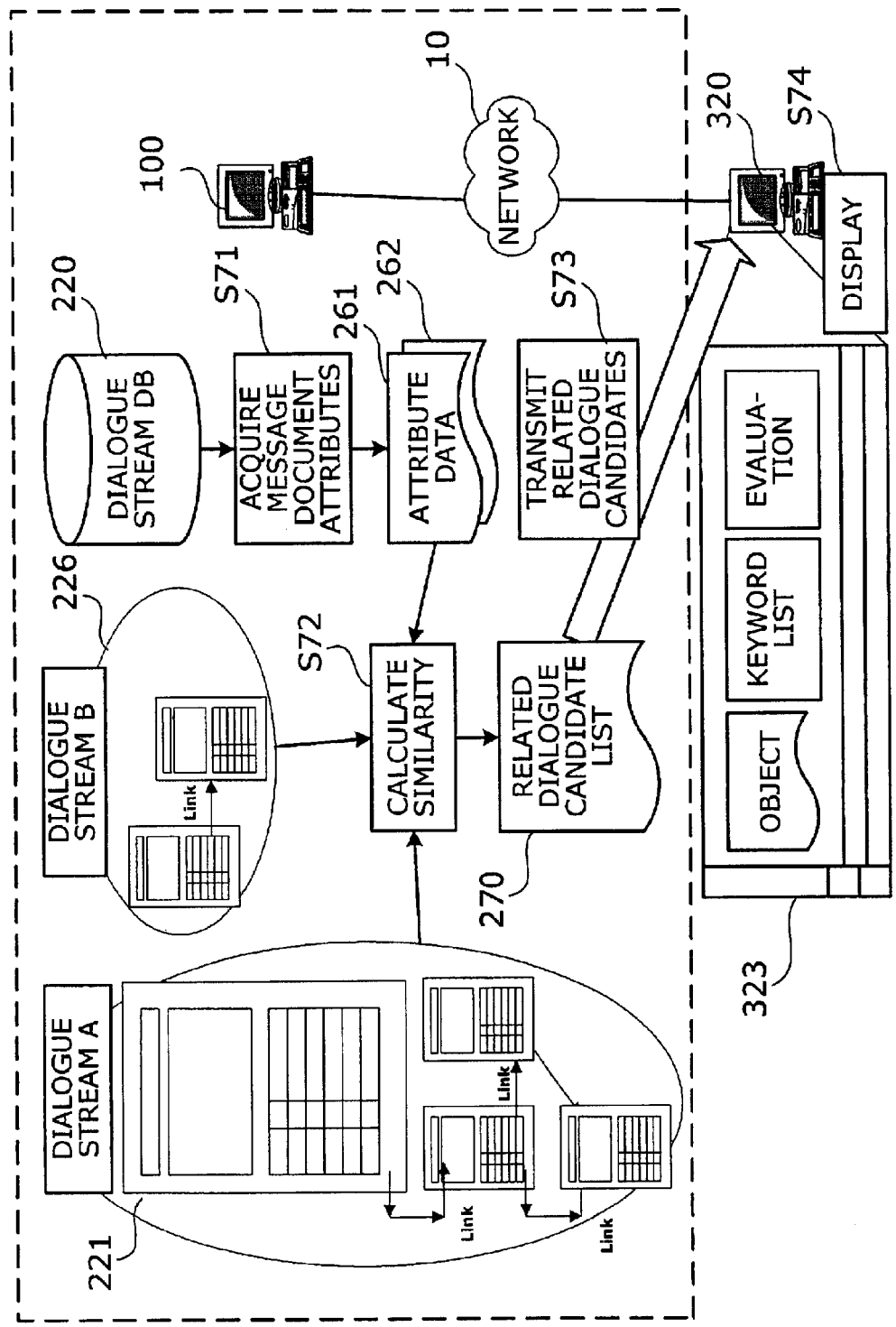
FIG. 20 is a diagram showing the concept of a related dialogue candidate providing process.

FIG. 20 shows the concept of a related dialogue candidate providing process. According to the related dialogue candidate providing process, the server 100 acquire attribute data 261, 262 of message documents from dialogue streams 221, 226 in the dialogue stream DB 220 in STEP S71. The attribute data include a participant list, an originating date, a keyword appearance frequency, etc. The server 100 compares the attribute data 261 of the dialogue stream 221 and the attribute data 262 of the dialogue stream 226 with each other, and calculates a similarity therebetween in STEP S72. The server 100 generates a related dialogue candidate list 270 based on the calculated similarity (evaluation), and transmits the related dialogue candidate list 270 to the client 320 in STEP S73.

The client 320 receives the related dialogue candidate list 270, and displays a view 323 showing the contents of the related dialogue candidate list 270 in STEP S74. The view 323 may contain objects related to message documents included in the dialogue streams.

In this manner, the user can know the relevancy between two dialogue streams which are not related to each other. For example, a high level of relevancy is shown if the participants of two dialogue streams, i.e., authors and receivers of message documents), are in full agreement with each other or agree with each other with a high probability (e.g., 80% or higher).

In FIG. 20, two dialogue streams to be compared with each other are specified at the outset for the sake of brevity. However, one or more message documents may be specified, and the server 100 may be instructed to retrieve a message document which is similar to those message documents. A process of retrieving a similar message document will be described below.

For enabling the server 100 to perform a retrieval process, it is necessary for the client 320 to specify a message document which serves as an origin. In the knowledge management system according to the present embodiment, a list of message documents is displayed on the display unit screen of the client 320 for the user to selectively specify message documents as origins from the list.

FIG. 21 shows a displayed retrieval specifying view by way of example. In FIG. 21, a retrieval specifying view 500 on displayed by the client 320 shows a list of message documents stored in the dialogue stream DB 220. The retrieval specifying view 500 has an origin specifying column 501, a type display column 502, a subject display column 503, an author display column 504, and an originating date display column 505.

The origin specifying column 501 is used to enter an instruction as to whether each of the message documents is to be used as an origin. In the origin specifying column 501, a check mark is displayed for each message document that is to be used as an origin.

The type display column 502 displays the types of the respective message documents. The subject display column 503 displays the subjects of the respective message documents. The author display column 504 displays the names of the authors of the respective message documents. The originating date display column 505 displays the originating dates of the respective message documents.

When the user specifies message documents serving as origins for retrieval in the retrieval specifying view 500 on the client 320 and transmits a retrieval request to the server 100, the server 100 returns a retrieved result to the client 320.

Figure 22:
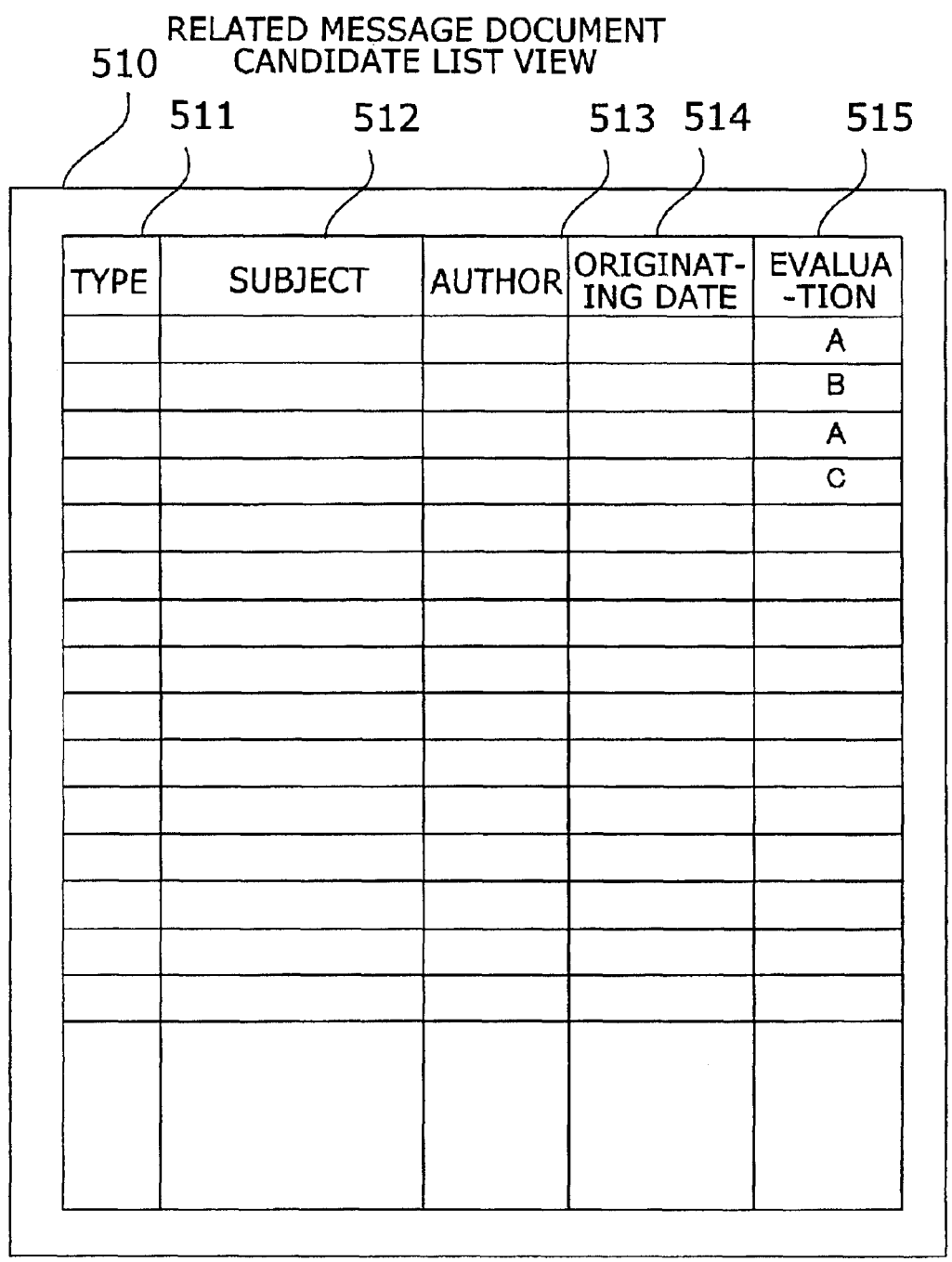
FIG. 22 is a view showing a displayed related message document candidate list view.

FIG. 22 shows a related message document candidate list view by way of example. In FIG. 22, a related message document candidate list view 510 shows a list of message documents stored in the dialogue stream DB 220 of the server 100. The related message document candidate list view 510 has a type display column 511, a subject display column 512, an author display column 513, an originating date display column 514, and an evaluation display column 515. The type display column 511, the subject display column 512, the author display column 513, and the originating date display column 514 displays the same information as that which is disposed in the corresponding columns of the retrieval specifying view 500 shown in FIG. 21.

The evaluation display column 515 shows evaluations of respective message documents. In FIG. 22, each of the evaluations is specified in one of three stages. In the evaluation display column 515, "A" is displayed for message documents which have a high level of similarity to the message documents which are specified as an origin in the retrieval specifying view 500, "B" is displayed for a message document which has some similarity to the message documents which are specified as an origin in the retrieval specifying view 500, and "C" is displayed for a message document which has almost no similarity to the message documents which are specified as an origin in the retrieval specifying view 500.

In the related message document candidate list view 510, the user can select a desired message document and have details of the selected message document on the display unit screen of the client 320.

Figure 23:
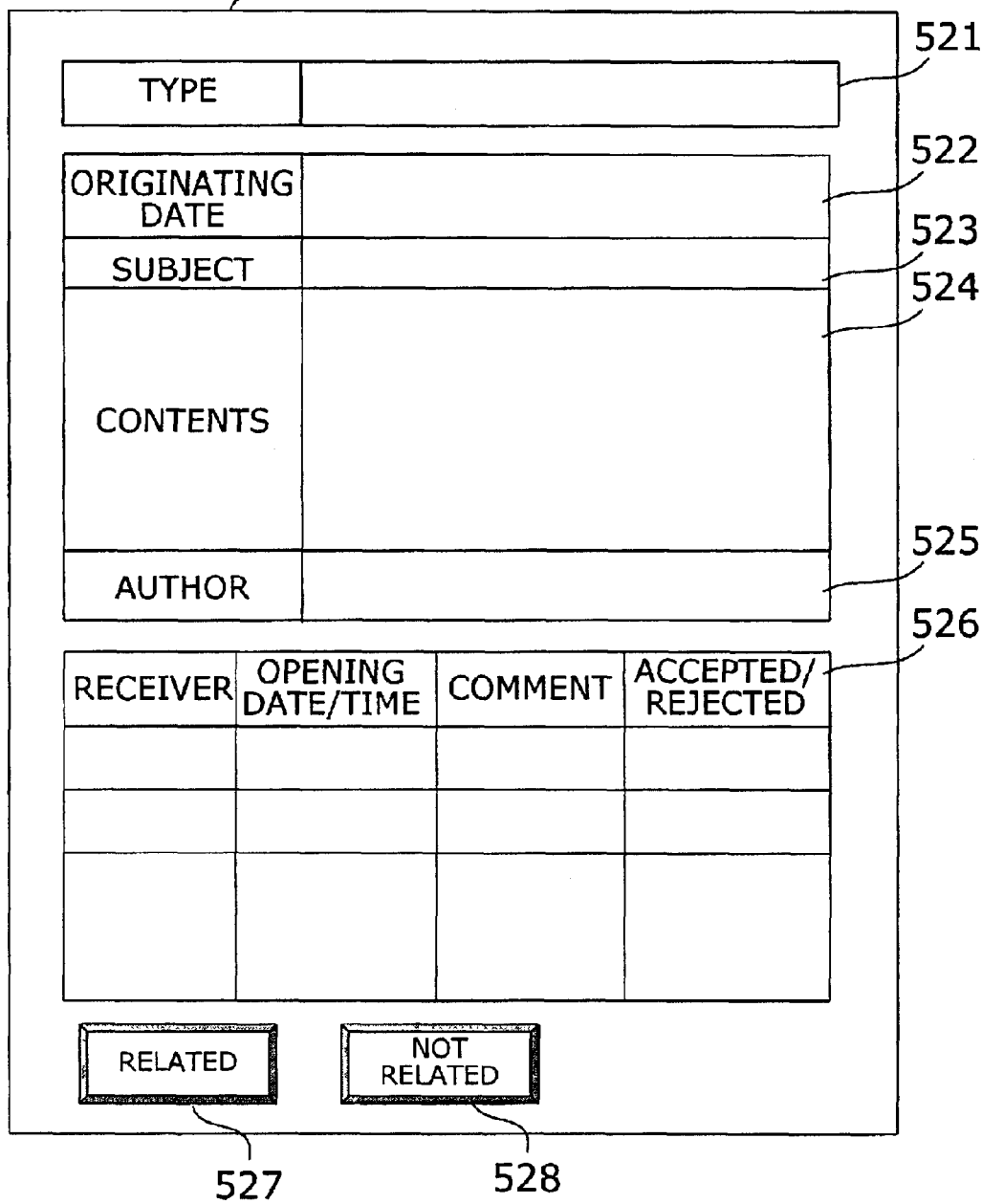
FIG. 23 is a view showing a displayed message document detail display view.

FIG. 23 shows a displayed message document detail display view by way of example. In FIG. 23, a displayed message document detail display view 520 has a type display box 521, an originating date display box 522, a subject display box 523, contents display box 524, an author display box 525, a receiver data display box 526, a related-status indicating button 527, and a not-related-status indicating button 528.

The type display box 521 displays the type of a message. The originating date display box 522 displays the originating date of a message document which is being displayed. The subject display box 523 displays the subject of the message document which is being displayed. The contents display box 524 displays the contents of the message document which is being displayed. The author display box 525 displays the user name of the author who has registered the message document which is being displayed.

The receiver data display box 526 displays a table of data of receivers who have received the message document. The receiver data display box 526 has columns of receivers, opening dates/times, comments, and accepted/rejected statuses. The column of receivers displays the user names of users (receivers) who have been specified as destinations of the message document. The column of opening dates/times displays dates and times when receivers have opened the message document. The column of comments displays comments which receivers entered in the comment input box 62 of the comment registration view 60 shown in FIG. 12. The column of accepted/rejected statuses displays whether receivers have accepted or rejected the message document.

The related-status indicating button 527 is a button for relating the displayed message document to the message document which has been specified as an origin. When the related-status indicating button 527 is pressed, a relating request is sent to the server 100, which relates the displayed message document to the message document which has been specified as an origin.

The not-related-status indicating button 528 is a button for closing the displayed document, without relating the displayed document.

Figure 24:
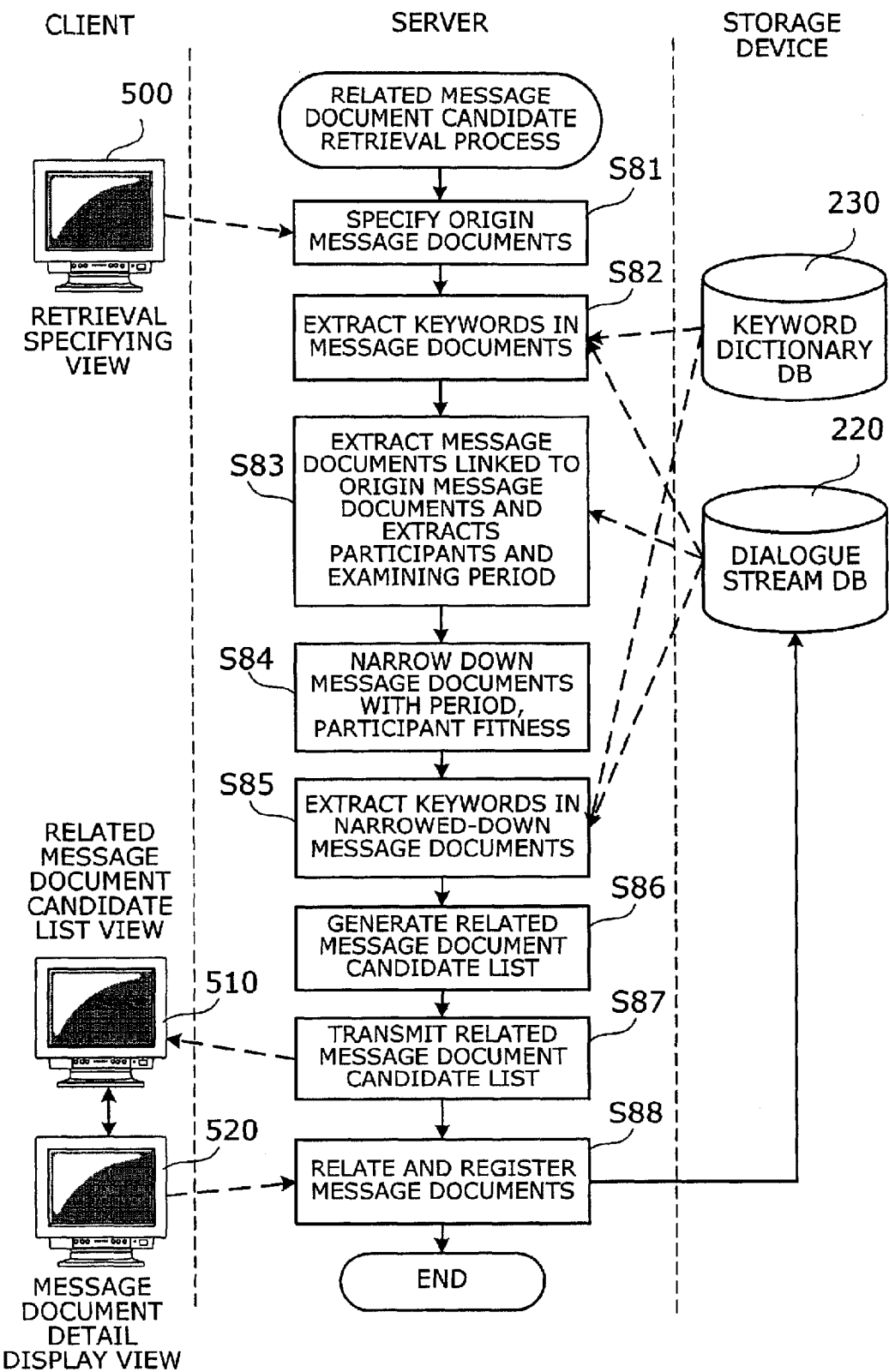
FIG. 24 is a flowchart of a process of retrieving related message document candidates.

FIG. 24 is a flowchart of a process of retrieving related message document candidates. The process shown in FIG. 24 will be described below successively with respect to step numbers therein.

[STEP S81] The server 10 receives specified origin message documents from the client 320. Specifically, a list of message documents which have been specified as origins in the retrieval specifying view 500 on the client 320 is transmitted from the client 320 to the server 100.

[STEP S82] The server 100 acquires the origin message documents from the dialogue stream DB 220. The server 100 refers to the keyword dictionary DB 230 and extracts keywords of the message documents registered in the dialogue stream DB 220.

[STEP S83] The server 100 extracts message documents linked to the origin message documents, e.g., higher- and lower-level message documents directly linked to the origin message documents, and repeatedly finds message documents further linked from the extracted message documents, thus extracting a plurality of message documents ranging from a message document which serves as the start of the discussion to a message document which serves as the end of the discussion. Then, the server 100 extracts the participants of the message documents and the examining period from the extracted message documents. The start of the examining period is recognized from the originating date of the message document which serves as the start of the discussion, and the end of the examining period is recognized from the due date of the message document which serves as the end of the discussion. The due date of a message document can be specified by an instruction from the author. A message document for which no due date is specified has its examining period ended a certain period, e.g., one week, from the originating date of the message document. The examining period of a message document may be ended by an instruction from the author even before the due date thereof is reached.

[STEP S84] The server 100 narrows down the message documents in the dialogue stream DB 220 with the examining period of the message documents extracted in STEP S83. Specifically, the server 100 extracts only those message documents whose examining period overlaps that of the message documents extracted in STEP S83, from the dialogue stream DB 220. The server 100 determines a matching between the participants in the message documents extracted in STEP S83 and the participants in the narrowed-down message documents. The server 100 further narrows down the message documents which have been narrowed down with the examining period, into message documents with a higher matching. For example, the server 100 extracts only those message documents whose participant matching ratio is 80% or higher.

[STEP S85] The server 100 extracts keywords in the message documents which have been narrowed down in STEP S84 in the dialogue stream DB 220.

[STEP S86] The server 100 determines a matching between the keywords of the origin message documents extracted in STEP S82 and the keywords of the message documents extracted in STEP S85. Based on the determined keyword matching, the server 100 evaluates each of the message documents narrowed down in STEP S83. The server 100 generates a list of related message document candidates based on the evaluation of each of the message documents.

[STEP S87] The server 100 transmits the related message document candidate list generated in STEP S86 to the client 320.

The display unit screen of the client 320 now displays the related message document candidate list view 510. If the client 320 displays the message document detail display view 520 and the user presses the related-status indicating button 527, then the client 320 sends a related message document registration request to the server 100.

[STEP S88] When the server 100 receives the related message document registration request from the client 320, the server 100 relates the origin message documents and the message documents specified in the related message document registration request to each other, i.e., link the message documents to each other, according to the related message document registration request.

In this fashion, related message document candidates extracted from the message documents which are not related to the origin message documents can be indicated to the user. Thus, when a message document related to a certain message document is composed, even if a message document is newly composed without being linked to a prior message document and a dialogue stream progresses parallel to the prior message document from the newly composed message document, a message document in the dialogue stream can be extracted as a related message document.

Also in the case where similar businesses are carried out parallel to each other in other groups or departments, those involved in the similar businesses can be notified of the existence of the similar business in the other groups or departments.

Accordingly, the business efficiency can be improved as an overlap of business operations between groups belonging to the same project can be found.

[Liking to a Problem Management Table]

It is customary to make a list of events (problems) which present an obstacle to efforts to perform a business. In many cases, a problem management table in the form of a list of problems is produced to let those involved in the business know the problems. If an object is a list such as a problem list or a task management list, then each of the items in the list can be related to message documents in a dialogue stream. In a retrieval process, a dialogue stream corresponding to each of the items in the list can be retrieved according to a user's instruction.

A process of relating message documents for an object which is in the form of a list will be described below.

Figure 25:
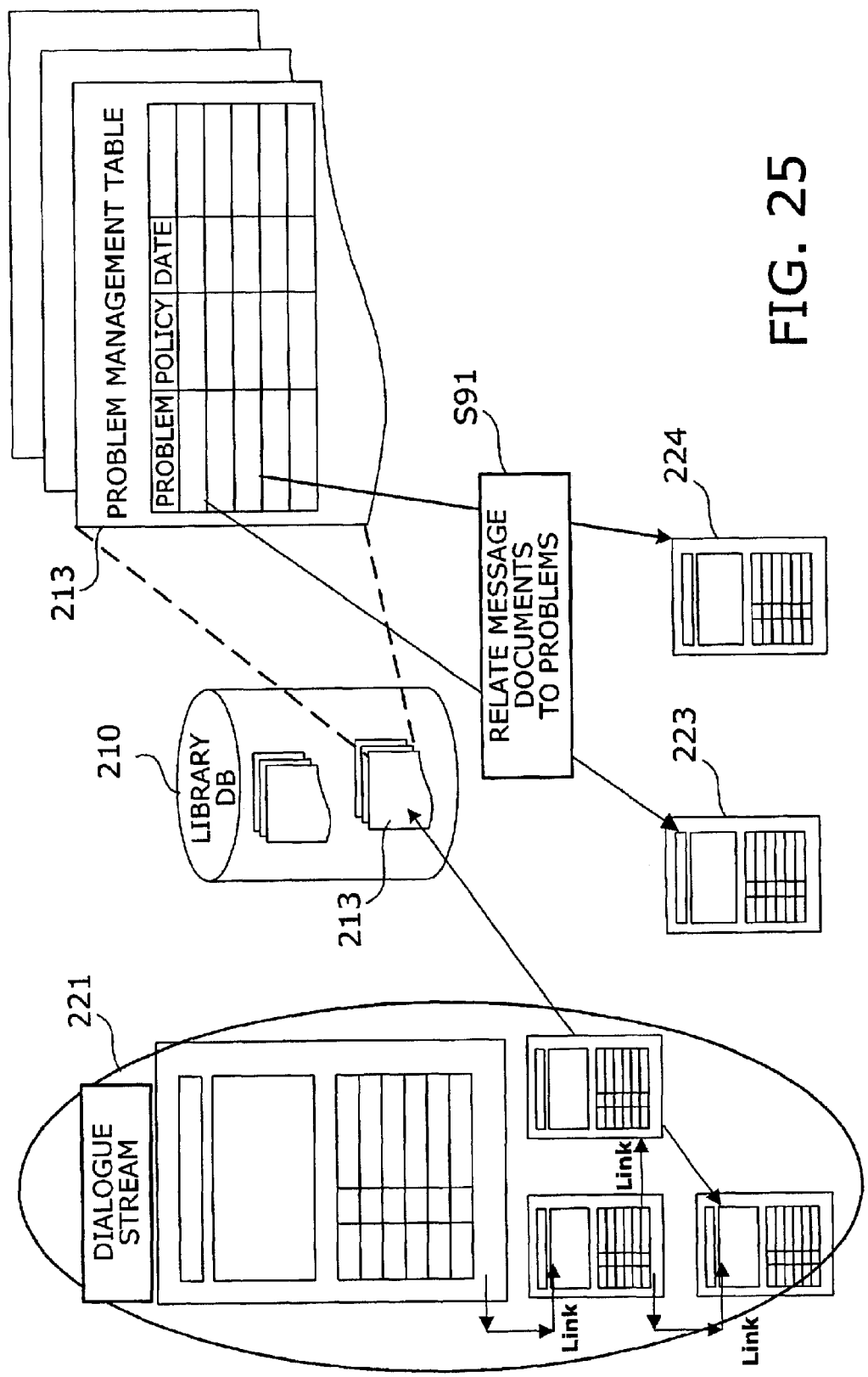
FIG. 25 is a diagram showing the concept of a process of relating a dialog stream to a problem management table.

FIG. 25 shows the concept of a process of relating a dialogue stream to a problem management table. A problem management table 213 as an object is registered in the library DB 210. The problem management table 213 contains various items of information including problems, policies, dates, etc. as table data with respect to events that cause problems to a business.

In the problem management table 213, each problem is related to a different dialogue stream. For example, a problem regarding a delivery schedule of a computer system is related to a dialogue stream discussing schedule adjustments. A problem relative to advertisement expenses for the sale of a computer system is related to a dialogue stream about a sales promotion process.

In the present embodiment, for an object such as the problem management table 213 which sets forth a list of problems, message documents 223, 224 can be related to respective problems in STEP S91. To each of the message documents, there are added information as to the object (problem management table) to be related and information as to which item (problem) in the object the message document is to be related to. In the object (problem management table), a message document to be related is set for each of the items (problems).

A plurality of items having different tasks are related to the problem management table 213. According to the present embodiment, therefore, when the problem management table 213 is found by an object retrieval process, an additional retrieval process for narrowing down message documents related to the problem management table 213 can be carried out. Such an additional retrieval process will be described below.

Figure 26:
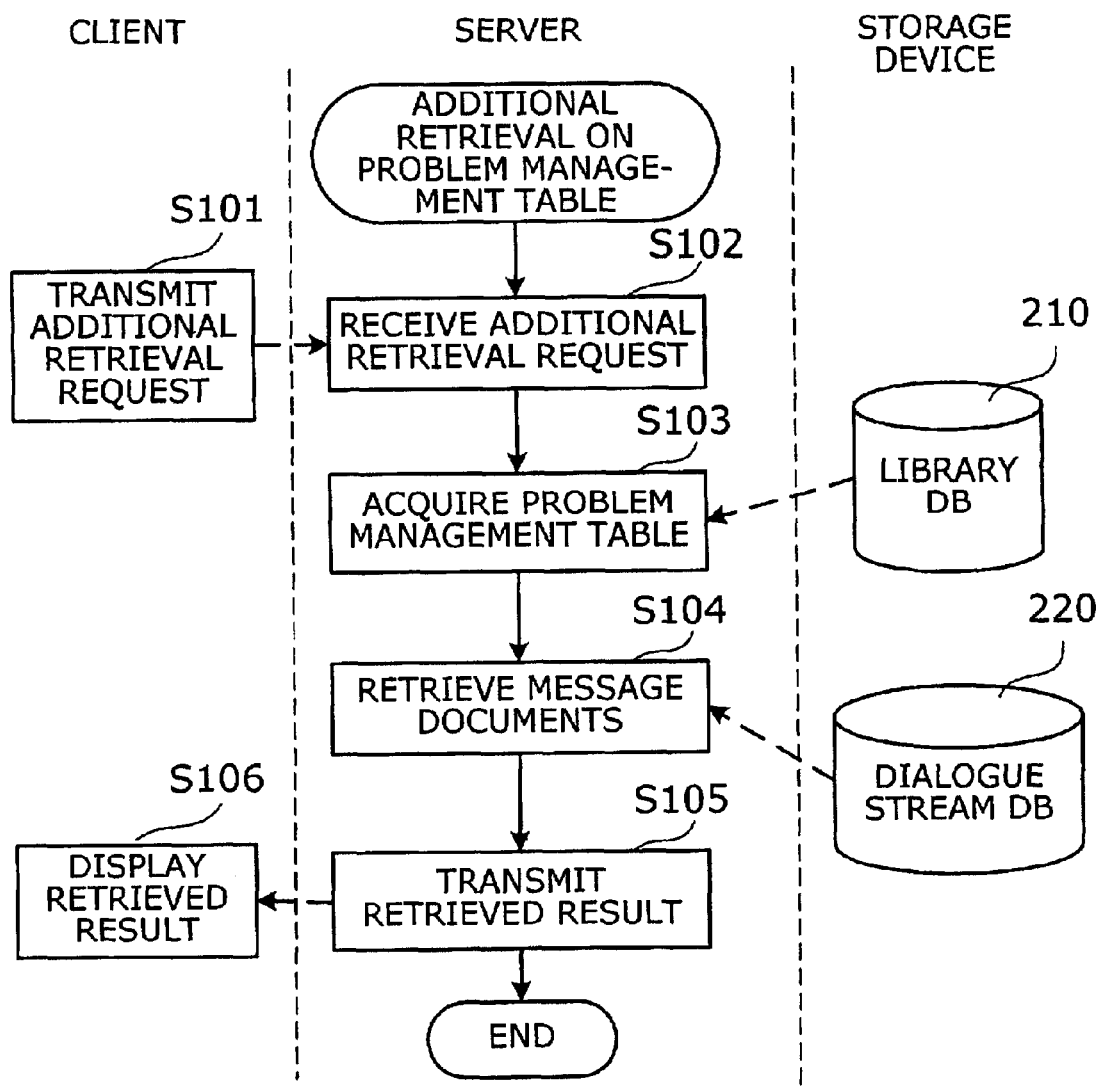
FIG. 26 is a flowchart of an additional retrieval process using the problem management table.

FIG. 26 is a flowchart of an additional retrieval process using the problem management table. The additional retrieval process shown in FIG. 26 will be described below successively with respect to step numbers therein.

[STEP S101] The client 320 transmits an additional retrieval request specifying the problem management table 213 to the server 100. For example, the client 320 requests the server 100 to perform a narrowing retrieval process based on the contents of problems, the dates of problems, etc.

[STEP S102] The server 100 receives the additional retrieval request from the client 320.

[STEP S103] The server 100 acquires the problem management table 213 specified by the additional retrieval request from the library DB 210.

[STEP S104] The server 100 performs a retrieval process based on retrieval conditions on the message documents in the dialogue stream DB 220 which are related to the problem management table 213 which has been acquired in STEP S103.

[STEP S105] The sever 100 transmits a retrieved result to the client 320.

[STEP S106] The client 320 displays the retrieved result on the display unit screen.

In this manner, an additional retrieval process can be performed using the problem management table 213. It is thus possible to find another message document which has discussed the same problem as a certain message document, via the problem management table 213.

[Applications of the Knowledge Management System]

The knowledge contained in dialogue streams and objects can be utilized highly effectively by performing all the functions of the knowledge management system according to the present embodiment.

Figure 27:
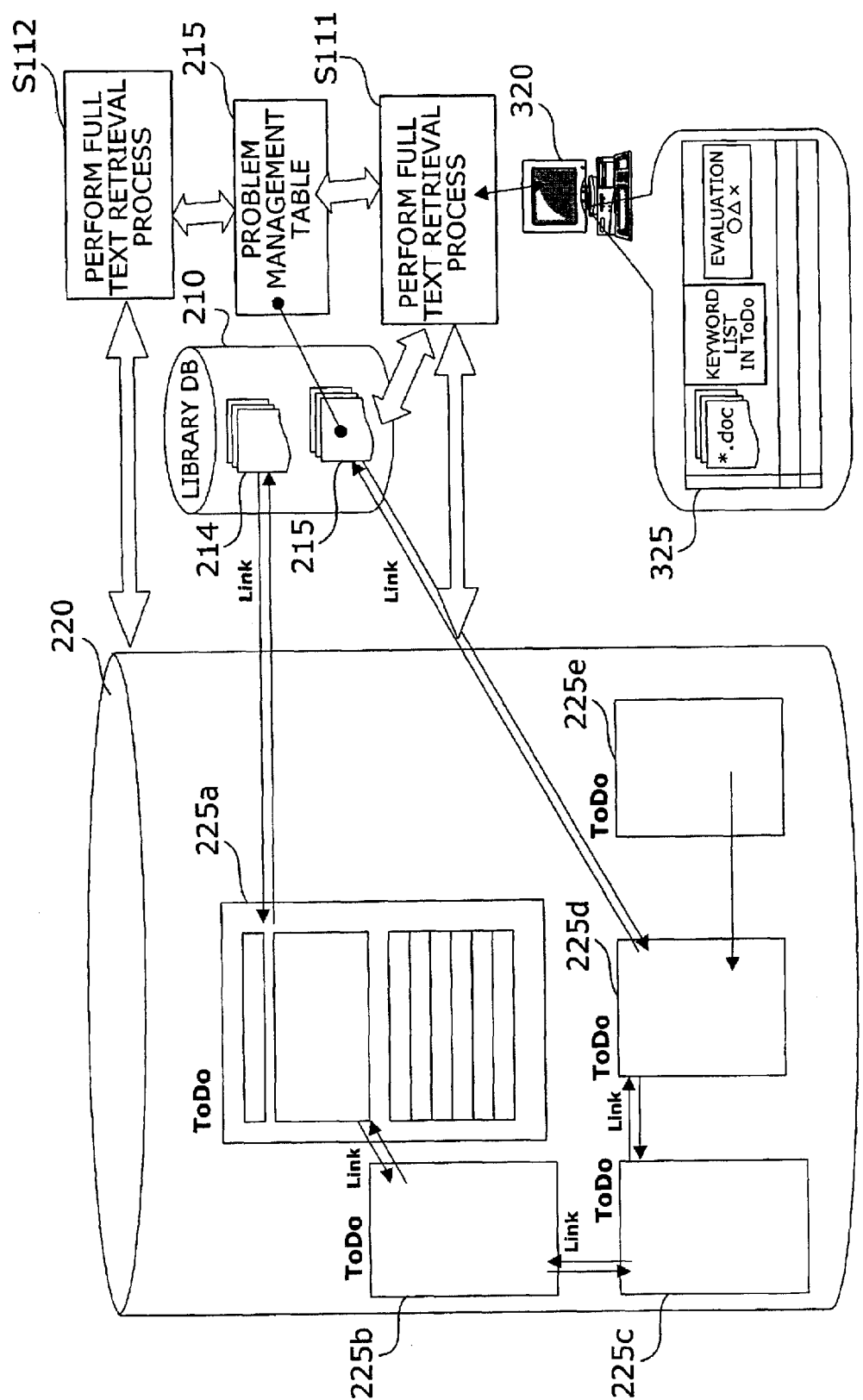
FIG. 27 is a diagram showing the concept of a retrieval process in the embodiment of the present invention.

FIG. 27 shows the concept of a retrieval process in the embodiment of the present invention. The user can use the knowledge management system via the client 320. For example, the user can instruct the client 320 to perform a full text retrieval process on the library DB 210 and the dialogue stream DB 220. The server 100 is instructed by the client 320 to perform a full text retrieval process on objects 214, 215 in the library DB 210 and message documents 225a through 225e (ToDo) in the dialogue stream DB 220 (STEP S111). If the object 215 is a problem management table, then an additional retrieval process based on full text retrieval can be performed on the object 215 (STEP S112). A retrieved result is displayed on a retrieved result view 325 on the client 320.

It is customary to deliver similar computer systems (application packages, etc.) to a plurality of customers substantially at the same time (e.g., such computer systems are highly likely to be introduced into offices in new-year holidays or at the end of a fiscal year). The similar computer systems thus delivered may possibly cause trouble to the different customers at the same time. When such trouble occurs, engineers in charge of the respective customers are individually required to analyze causes of the trouble. If the engineers store a dialog stream relative to the trouble analysis into the dialog stream DB 220 and relate message documents to a problem management table, then the engineers can be aware of the existence of each other's work by performing a retrieval process. As a result, the different engineers do not carry out an overlapping trouble analysis, resulting in improved business efficiency. If an engineer is tackling with a trouble for an undesirably long period of time, then the engineer may possibly find a clue to the solution by exchanging information with another engineer in charge of another customer who is suffering the same trouble. As a consequence, the period needed to solve the problem can be made shorter than if causes of the trouble are analyzed at one site.

Even if a message document 225e in the dialogue stream DB 220 is isolated, its similarity to other message documents can be calculated based on participants and examining periods, and the message document 225e can be displayed as a related message document candidate on the display unit screen of the client 320.

While the management of objects and dialogue streams has been described above, if the knowledge management system according to the embodiment is to be effectively utilized as part of a collaboration system, then it is desirable that the object DB and the dialogue stream DB be linked to data such as user information or the like. A data structure used when the embodiment of the present invention is applied to a collaboration system will be described below.

Figure 28:
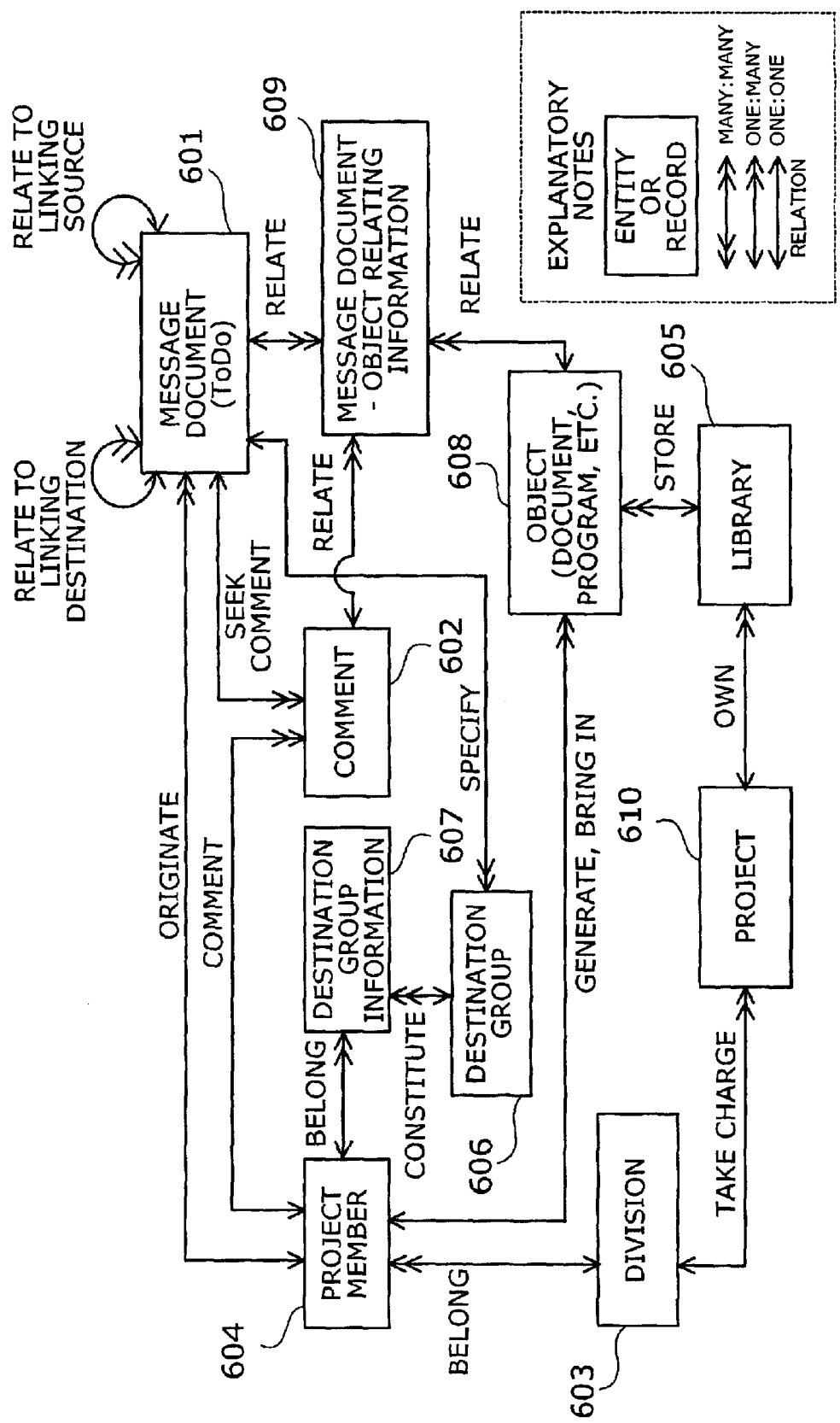
FIG. 28 is an ER (Entity-Relationship) diagram showing an example of a data structure constructed in a server of a knowledge management system.

FIG. 28 is an ER (Entity-Relationship) diagram showing an example of a data structure constructed in a server of a knowledge management system. In FIG. 28, the knowledge management system has an entity 601 of "message document (ToDo)", an entity 602 of "comment", an entity 603 of "division", an entity 604 of "project member", an entity 605 of "library", an entity 606 of "destination group", an entity 607 of "destination group information", an entity 608 of "object (document, program, etc.)", an entity 609 of "message document-object relating information", and an entity 610 of "project".

The entity 601 of "message document (ToDo)" is related to another entity 601 of "message document (ToDo)" in such a relationship as to be "related to a linking destination" and such a relationship as to be "related to a linking source" on a one:many basis. The entity 601 of "message document (ToDo)" and the entity 602 of "comment" are related to each other in such a relationship as to "seek a comment" on a one:many basis. The entity 601 of "message document (ToDo)" and the entity 604 of "project member" are related to each other in such a relationship as to "originate" on a many:one basis. The entity 601 of "message document (ToDo)" and the entity 606 of "destination group" are related to each other in such a relationship as to "specify" on a one:many basis. The entity 601 of "message document (ToDo)" and the entity 609 of "message document-object relating information" are related to each other in such a relationship as to be "related" on a one:many basis.

The entity 602 of "comment" and the entity 604 of "project member" are related to each other in such a relationship as to "comment" on a many:one basis. The entity 602 of "comment" and the entity 609 of "message document-object relating information" are related to each other in such a relationship as to be "related" on a one:many basis.

The entity 603 of "division" and the entity 604 of "project member" are related to each other in such a relationship as to "belong" on a one:many basis. The entity 603 of "division" and the entity 610 of "project" are related to each other in such a relationship as to "take charge" on a one:many basis.

The entity 604 of "project member" and the entity 607 of "destination group information" are related to each other in such a relationship as to "belong" on a one:many basis. The entity 604 of "project member" and the entity 608 of "object (document, program, etc.)" are related to each other in such a relationship as to "generate, bring in" on a one:many basis.

The entity 605 of "library" and the entity 608 of "object (document, program, etc.)" are related to each other in such a relationship as to "store" on a one:many basis. The entity 605 of "library" and the entity 610 of "project" are related to each other in such a relationship as to "own" on a many:one basis.

The entity 606 of "destination group" and the entity 607 of "destination group information" are related to each other in such a relationship as to "constitute" on a one:many basis. The entity 608 of "object (document, program, etc.)" and the entity 609 of "message document object relating information" are related to each other in such a relationship as to be "related" on a one:many basis.

The entity 601 of "message document (ToDo)" is information relating to a dialogue stream. In the entity 601 of "message document (ToDo)", there are registered for each message (message document) data including a message ID (identifier), a message type (a notice, a message (transmitting information), a due date, etc.) a registration date, a notice beginning date, an author's log-on user name, an author's name, a subject, contents, a related URL, a linking source message ID, a linking destination message ID, library (object) storage destination information, an e-mail transmission destination (a message transmission destination for E-mail linking), etc. If a link to e-mail is possible, then there are registered in the entity 601 of "message document (ToDo)" data including an e-mail transmission destination (CC:), (message transmission destination), an e-mail transmission destination (BCC:), (message transmission destination), an e-mail transmission result (message transmission result), a comment transfer flag (indicative of whether the content of a comment is to be transferred to another user or not when the reception of the comment is completed), etc.

The entity 602 of "comment" is information relating to a comment on a message document. In the entity 602 of "comment", there are registered for each comment data including the log-on user name of a message receiver, a message ID, the check completion date of each receiver, a comment text, a comment date/time, an acceptance/rejection status (indicative of whether the content of a message is accepted or rejected), a comment registration status (indicative of whether the registration of a comment is completed or not), etc.

The entity 603 of "division" is information relating to a division. In the entity 603 of "division", there are registered for each division data including a division code (an identifier representing a division), a division name, a display rank (e.g., a higher post is displayed as a higher rank), a company name, a division type, etc.

The entity 604 of "project member" is information relating to a user. In the entity 604 of "project member", there are registered data including a log-on user ID, a name, a division code, a post, an e-mail address, an extension number, a telephone number, a FAX number, a registration date, a previous log-in date, a log-in count, a user type (a manager, a general user, a guest, a visitor, etc.), etc.

The entity 605 of "library" is information relating to an area (library) for storing an object. In the entity 605 of "library", there are stored for each library a pass ID (the pass ID of a folder which is produced by the user), an actual folder name, a folder name for display on the display unit screen, a project number, etc.

The entity 606 of "destination group" is information relating to a group specified as a destination of a message document. In the entity 606 of "destination group", there are registered for each group data including a group ID, a group name, a generation date/time, a generator, etc., for example.

The engine 607 of "destination group information" is information relating to a group to which the user belongs. In the engine 607 of "destination group information", there are registered a destination group ID, the log-on user ID of a destination, etc., for example.

The entity 608 of "object (document, program, etc.)" is information relating to an object. In the entity 608 of "object (document, program, etc.)", there are registered data including a library ID (an identifier for uniquely identifying an object), a project number, a pass ID, a file name, a file date, an access right (for allowing or rejecting a write event), a registrant ID (the log-in user name of a registered user), a registration date, a final updater ID (the log-in ID of a finally updated user), a final updating date, an object name, etc., for example.

The entity 609 of "message document-object relating information" is information relating to linking between a message document and an object. In the entity 609 of "message document-object relating information", there are registered for each linking event data including a identification ID (an identifier for uniquely identifying relating information), a message ID, a library ID, a project number, a pass ID, a file name, a user ID (the log-in user ID of a registrant), etc., for example.

The entity 610 of "project" is information relating to a project. In the entity 610 of "project", there are stored data including a project code, a customer code, a project name, a project summary, etc., for example.

By constructing a database of the above data structure in the storage device 200 of the server 100, the processing according to the present embodiment can be embedded in a collaboration system.

[Use of a Generator Apparatus]

If a plurality of servers (knowledge information managing apparatus) of the knowledge management system in the present embodiment are present on a network, then best-practice information can be generated using the knowledges (objects and dialogue streams) accumulated in the knowledge information managing apparatus. The apparatus for generating such best-practice information will be referred to as a generator apparatus (knowledge information generating apparatus).

Figure 29:
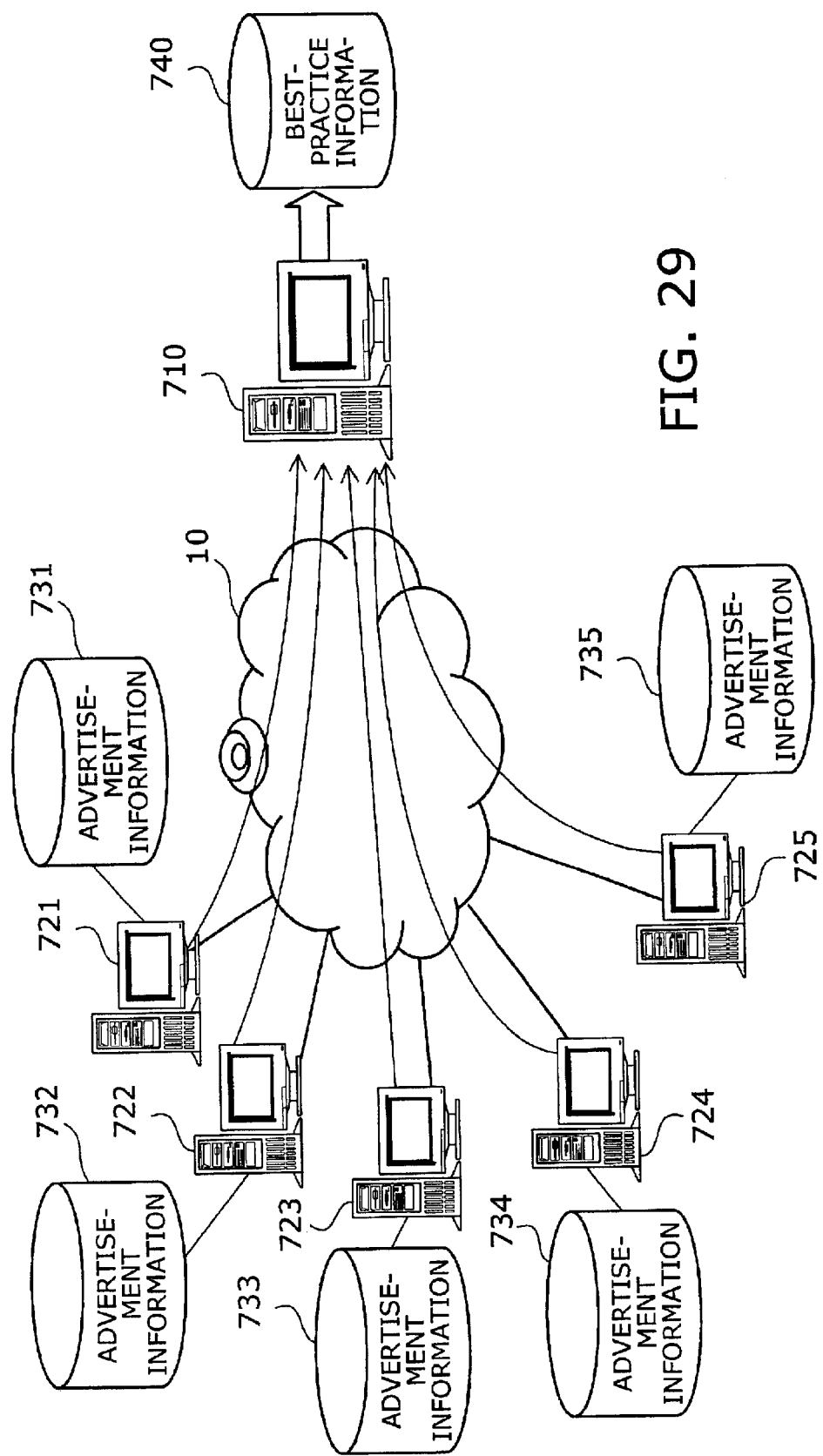
FIG. 29 is a diagram showing the concept of an application of a generator apparatus.

FIG. 29 shows the concept of an application of a generator apparatus. In the example shown in FIG. 29, a generator apparatus 710 and a plurality of knowledge information managing apparatus 721 through 725 are connected to each other through a network 10. Although not shown, a number of clients are connected to the network 10.

The knowledge information managing apparatus 721 through 725 have respective advertisement information 731 through 735. The advertisement information 731 through 735 is information which is used by organizations using the knowledge information managing apparatus 721 through 725 to advertise their own businesses. The advertisement information 731 through 735 includes knowledges such as objects, dialogue streams, etc.

The generator apparatus 710 can collect the advertisement information 731 through 735 stored in the knowledge information managing apparatus 721 through 725, and generate best-practice information 740 from the collected information. The best-practice information 740 represents a business performing case for solving a problem, which is generated by combining best knowledges among the knowledges that are generated by the knowledge information managing apparatus 721 through 725.

Figure 30:
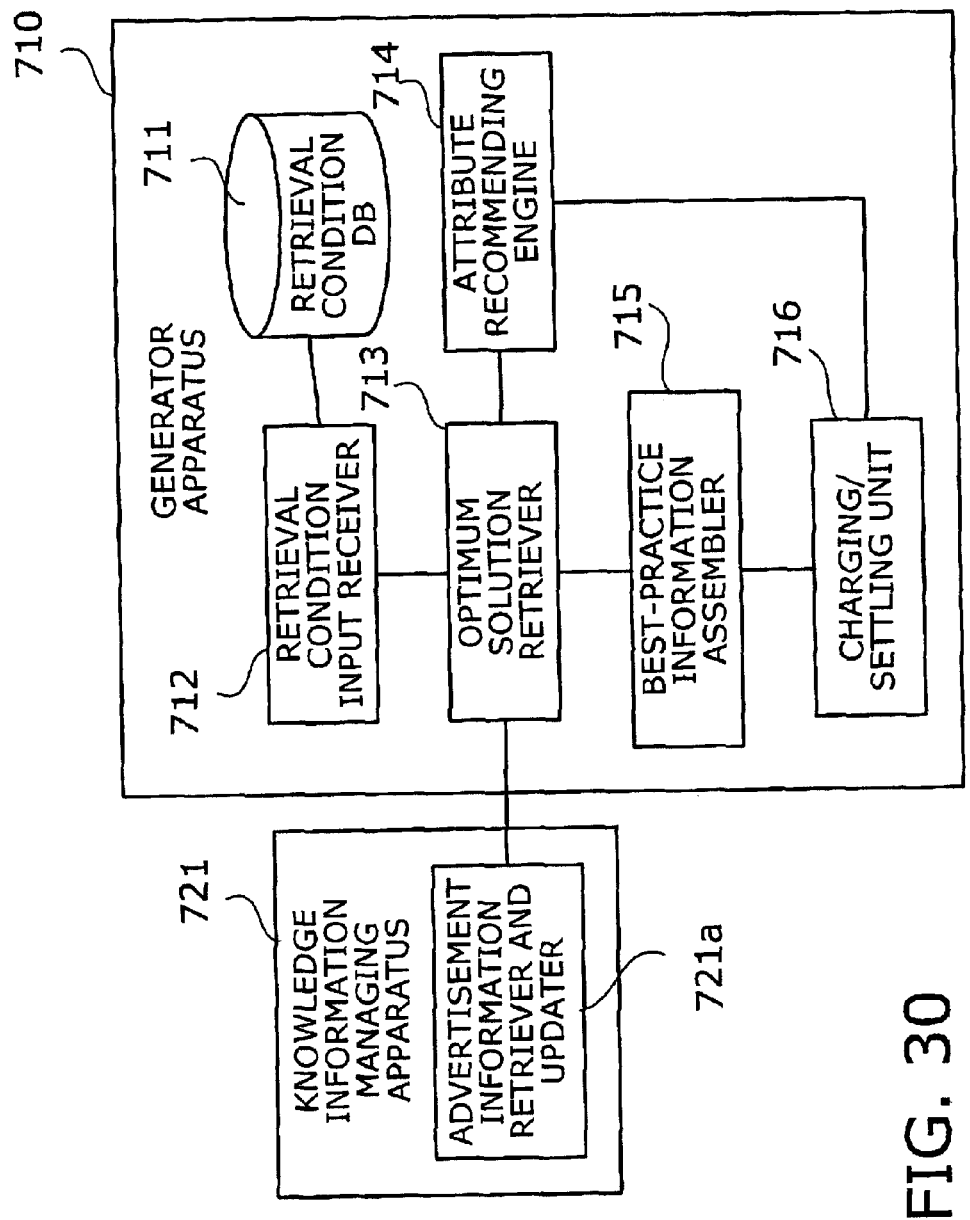
FIG. 30 is a block diagram of a best practice generating function using the generator apparatus.

FIG. 30 shows in block form a best practice generating function using the generator apparatus. The knowledge information managing apparatus 721 has an advertisement information retriever and updater 721a for retrieving and updating advertisement information containing objects, dialogue streams, etc.

The generator apparatus 710 comprises a retrieval condition database (DB) 711, a retrieval condition input receiver 712, an optimum solution retriever 713, an attribute recommending engine 714, a best-practice information assembler 715, and a charging/settling unit 716.

The retrieval condition DB 711 holds retrieval conditions entered by the user.

The retrieval condition input receiver 712 receives a retrieval condition entered by the user. The retrieval condition input receiver 712 stores an entered retrieval condition into the retrieval condition DB 711. The retrieval condition input receiver 712 also can present a retrieval condition stored in the retrieval condition DB 711 to the user. The retrieval condition input receiver 712 can receive a retrieval condition from the user in the form of a sentence. When a retrieval condition is entered in the form of a sentence, the retrieval condition input receiver 712 analyzes the content of the sentence and automatically generates a retrieval formula. The retrieval condition input receiver 712 transfers an entered retrieval condition to the optimum solution retriever 713.

The optimum solution retriever 713 has an agent function to go from system to system and search for information according to a retrieval request from the user. The agent function allows the user to collect advertisement information which is managed by the knowledge information managing apparatus 721 through 725 from the knowledge information managing apparatus 721 through 725 which are scattered on the network 10. The optimum solution retriever 713 retrieves optimum advertisement information (optimum solution) that matches the retrieval condition received from the retrieval condition input receiver 712, from the knowledge information managing apparatus 721 through 725 which are scattered on the network 10. The information which can be an optimum solution is indicated by the attribute recommending engine 714. The extracted advertisement information is transmitted to the best-practice information assembler 715.

The attribute recommending engine 714 calculates to determine which attribute makes advertisement information suitable for an optimum solution, and indicates the attribute to the optimum solution retriever 713. For example, the attribute recommending engine 714 determines that advertisement information provided to many users for a fee becomes an optimum solution, based on settlement information received from the charging/settling unit 716.

The best-practice information assembler 715 combines advertisement information received from the optimum solution retriever 713 to generate best-practice information, and provides the best-practice information to the user. For example, the best-practice information assembler 715 displays information acquired by the optimum solution retriever 713 on the display unit screen of the client based on a request from the client. The user selects information, and the best-practice information assembler 715 integrates and combines all the items of information selected by the user into a collection of reusable materials (best-practice information) which is provided to the user.

The charging/settling unit 716 charges the user for the best-practice information provided to the user by the best-practice information assembler 715, and settles the charge.

With the above knowledge management system, the knowledge information managing apparatus 721 through 725 successively update the advertisement information 731 through 735 as the business is performed. The updated advertisement information 731 through 735 is collected by the optimum solution retriever 713.

When the user enters a retrieval condition into the generator apparatus 710, the retrieval condition is transferred from the retrieval condition input receiver 712 to the optimum solution retriever 713. The optimum solution retriever 713 extracts an optimum solution matching the retrieval condition from the collected advertisement information 731 through 735 according to an instruction from the attribute recommending engine 714, and transfers the optimum solution to the best-practice information assembler 715.

The best-practice information assembler 715 generates best-practice information based on the optimum solution received from the optimum solution retriever 713, and provides the best-practice information to the user. The charging/settling unit 716 charges the user and settles the charge.

In this manner, knowledges separately stored in a plurality of organizations can be combined and provided to the user.

For example, the knowledge management system is linked with an in-office system such as a personal management system or an accounting system, and various items of project information including the cost of a project, the man hours of the project, the period of the project, the resources of the project, businesses involved in the project, success and failure divisions, the personal history information of the project leader, the personal history information of the project members, etc. are collected and displayed on the display unit screen of the client upon request from the user. The displayed information is used as reference information by the user for evaluation, and can easily be rejected or selected. Thus, the knowledges stored in various projects can be shared within the company for improved operation efficiency.

The knowledge information management apparatus and the generator apparatus may be used to automatically generate an environment (a series of work areas for meetings, generating designs, and generating and testing applications) to promote a project within an ASP (Application Service Provider) center on an information communication network, and such an environment may be rented to the user. The user may be charged depending on the amount of reused information, and a fee for the intermediary service to provide the information may be taken from the charge whereas the remainder of the charge may be returned as a fee to use the information to the information provided, thereby establishing a mutual growth (win—win) relationship.

The above arrangement gives both the ASP provider and the user (who can be both an information provider or an information user) various merits shown below, and the number of projects that use the collected information is expected to automatically increase.

[Merits for the ASP Provider]

The ASP provider can collect a feed for using the environment, and can earn a fee from the distribution of information.

As more and more users are involved, more and more information is accumulated.

The ample amount of accumulated information serves as a material for inviting more users. Both the fee for using the environment and the fee for the distribution of information increase as the number of users increase.

Since the 95% of the information which has heretofore been discarded is stored in the server in connection with documents, etc., it does not need to be organized for reuse. Stated otherwise, the documents, etc. serve as an index for locating the 95% of the information which has heretofore been discarded. Therefore, the ASP provider is relieved of the information organizing work for reusing the 95% of the information which has heretofore been discarded. The organized 5% of the information which has heretofore been reused is naturally expected to be reused more than before because the value of the organized information is higher than before as the information about the analytical details and processes contained in the 95% of the information which has heretofore been discarded exists as added values.

[Merits for the User (Who Can Be an Information Provider or User)]

Since the user is not required to introduce a server and employ a dedicated operation administrator unlike a situation where the user itself prepares an environment for promoting a project, the period of time needed for the user to start the project is shortened. The user is also not required to spend time and labor to keep personnel for the operation of the project, and hence can run the project at a low cost.

When the project is to be started, the infrastructure for managing and promoting the project can be prepared within a short period of time without the need for a person in charge. This merit is particularly useful at the time of a personnel shortage (not enough personnel available) when starting the project.

The user can obtain one set of cases or examples of a previous project at the time of starting the user's own project. The user can also obtain timely information of similar projects even while the user's own project is in progress. Inasmuch as abundant information of other projects can be reused at any time, the examining time that the user spends for the project may be shorter than if the user were to think of processes on its own, and the quality of the project can be increased as proven processes of previous projects can be reused.

Dialogue streams and libraries on the communication network are daily work sites for the members who participate in the project. The user can be an information provider unconsciously by using the scheme (ASP center). The reasons for this are as follows; When the user processes usual work using or on the scheme, information is accumulated of its own accord in the server. Since the accumulated information can be referred to from other projects, it is not necessary to register or advertise the information for the purpose of providing the information to the other projects.

Even after the user's project has been completed, when the information produced in the project is reused in other projects, the user can earn a fee for the use of the information.

The possibility of new businesses is expected as users are in a relationship to exchange their knowledges (give-and-take relationship).

[Possibility of Applications to Various Other Business Categories]

This scheme is effective as an ASP including software houses for system development projects. The scheme is also applicable to not only system development projects, but also general project engineering industries such as construction industries and heavy industries. Servers (knowledge information managing apparatus) are established for respective industries/businesses, and projects of similar industries/businesses are collected for an increased reusing effect. It is possible to promote an information distribution by using a setup (generator apparatus) for collecting, with an agent technology, project cases or examples of similar industries/businesses on the servers (knowledge information managing apparatus) which are scattered on the network.

[Advantages of the Embodiment]

According to the embodiment of the present invention, the information of objects stored in the library and dialogue streams daily exchanged between members are closely related to each other and can be provided to the user. Therefore, not only objects as fruits, but also objects representing analytical processes and details which have heretofore been difficult to reuse and which have been used at intermediate stages, can be reused.

Information (objects) about processes and techniques which do not appear in objects produced in certain projects and which have been given up in analytical stages is accompanied by analytical details and processes. By scrutinizing the contents of that information, it is possible to start a quick examination as to why those processes and techniques have been given up in similar projects and whether those discarded processes and techniques are effective in the present project or not. Thus, the reuse of processes and techniques which fail to be materialized is promoted, and a waste of time and efforts to analyze the same thing in one company again is avoided.

If another project which is in progress has already examined a process or a technique, which the present project is considering to employ, prior to the present project, then the details of the examination can be obtained from the other project. This makes it possible to determine the direction of the project much faster than if the project started to be examined from scratch. As a result, the total man hours of the project and the overall construction term of the project can be reduced.

[Providing Programs Which Achieve the Processing of the Present Embodiment]

The above processing functions can be performed by a server computer and a client computer. There are provided a server program describing the contents of the functions that the knowledge information managing apparatus and the generator apparatus (knowledge information generating apparatus) are to have and a client program describing the contents of the functions that the knowledge information using apparatus is to have. By running the server program on the server computer, the processing functions of the knowledge information managing apparatus and the generator apparatus (knowledge information generating apparatus) are realized on the server computer. By running the client program on the client computer, the processing functions of the knowledge information using apparatus are realized on the client computer.

The server program and the client program which describe the processing details can be recorded on a computer-readable recording medium. The computer-readable recording medium may be a magnetic recording device, an optical disk, a magneto-optical recording medium, a semiconductor memory, or the like. The magnetic recording device may comprise a hard disk drive (HDD), a floppy disk (FD), a magnetic tape, or the like. The optical disk may comprise a DVD (Digital Versatile Disc), a DVD-RAM (Random Access Memory), a CD-ROM (Compact Disc Read Only Memory), a CD-R (Recordable)/RW (ReWritable), or the like. The magneto-optical recording medium may comprise an MO (Magneto-Optical) disk or the like.

For distributing the server program and the client program, portable recording mediums such as DVDs, CD-ROMs, etc. where the programs are recorded are sold. The client program may be stored in a memory of the server computer, and may be transferred from the server computer to the client computer via a network.

The server computer which executes the server program stores the server program recorded in a portable recording medium into its own memory. Then, the server computer reads the server program from its own memory, and performs a processing operation according to the server program. Alternatively, the server computer may read the server program directly from the portable recording medium and perform a processing operation according to the server program.

The client computer which executes the client program stores the client program recorded in a portable recording medium or the client program transferred from the server computer into its own memory. Then, the client computer reads the client program from its own memory, and performs a processing operation according to the client program. Alternatively, the client computer may read the client program directly from the portable recording medium and perform a processing operation according to the client program. Further alternatively, each time a fraction of the client program is transferred from the server computer, the client computer may perform a processing operation according to the transferred fraction of the client program.

In the method of and the apparatus for managing knowledge information according to the present invention, a dialogue stream and an object required in performing a business are related to each other, and the information of the dialogue stream and the object which are related to each other is outputted in response to a related information acquiring request. Therefore, there is provided an environment in which if a dialogue stream discussing a desired problem is found, then not only an object as a fruit, but also an object representing analytical details and a process which have led to information as the fruit can be reused.

In the method of generating knowledge information according to the present invention, when a retrieval request is entered, items of knowledge information that match the retrieval request are collected, and a plurality of items of knowledge information from among the collected items of knowledge information that match the retrieval request are combined to generate new knowledge information. Therefore, it is possible to present best-practice information based on the information of analytical details and a process which have led to information as a fruit.

In the method of using knowledge information according to the present invention, a relating request specifying a dialogue stream and an object is outputted to a server computer which has stored knowledge information in response to a control input, a related information acquiring request is outputted to the server computer in response to a control input, and information transmitted from the server computer is displayed. Therefore, it is possible to reuse information based on the information of analytical details and a process which have led to information as a fruit.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of managing knowledge information for a computer which manages knowledge information shared through a network, comprising the steps of:

managing a series of message data exchanged between persons involved in a business through the network in order to perform the business to solve a problem, accumulating dialogue streams containing contents of the series of message data, and sequentially accumulating objects required to perform the business in a process from generation of the problem to a conclusion about the problem, in a state in which the objects are required;

relating a desired one of the accumulated dialogue streams and a desired one of the accumulated objects to each other in response to a relating request; and outputting information about the desired dialogue stream and the desired object which are related to each other in response to a related information acquiring request.

2. The method according to claim 1, wherein when the desired dialogue stream and the desired object are related to each other, the desired object is related to a desired one of dialogue data included in the desired dialogue stream.

3. The method according to claim 1, wherein the desired dialogue stream and the desired object are related to each other in response to a control input from a user.

4. The method according to claim 1, wherein the objects required to perform the business include an object serving as a starting material for performing the business, an object that is referred to while the business is being performed, an object that is produced while the business is being performed, and an object that is perfected when the business is completed.

5. The method according to claim 1, wherein a list of keywords in the desired dialogue stream is added to the information about the desired dialogue stream and the desired object which are related to each other.

6. The method according to claim 1, further comprising the steps of:

in response to a related candidate acquiring request specifying a dialogue stream, determining a relevancy between the specified dialogue stream and another dialogue stream which is not related to the specified dialogue stream; and outputting the relevancy between the specified dialogue stream and the other dialogue stream.

7. The method according to claim 1, wherein when the desired dialogue stream and the desired object are related to each other, if the desired object has a plurality of items, then the desired dialogue stream is related to a desired one of the items of the desired object.

8. The method according to claim 1, wherein if a retrieval condition with respect to a dialogue stream is specified in the related information acquiring request, then a dialogue stream matching the retrieval condition is extracted from the accumulated dialogue streams, and information about the extracted dialogue stream and an object related to the extracted dialogue stream from among the accumulated objects is outputted.

9. The method according to claim 1, wherein if a retrieval condition with respect to an object is specified in the related information acquiring request, then an object matching the retrieval condition is extracted from the accumulated objects, and information about the extracted object and a dialogue stream related to the extracted object from among the accumulated dialogue streams is outputted.

10. A method of generating knowledge information for a computer which analyzes contents of knowledge information, comprising the steps of:

in response to a retrieval request, collecting items of knowledge information matching the retrieval request from items of knowledge information accumulated in another computer connected to the computer through a network;

combining desired items of knowledge information from the collected items of knowledge information matching the retrieval request to generate new knowledge information; and outputting the generated new knowledge information.

11. A method of using knowledge information for a computer which uses through a network knowledge information which comprises dialogue streams containing a series of message data exchanged between persons involved in a business through the network in order to perform the business to solve a problem, and objects required to perform the business in a process from generation of the problem to a conclusion about the problem, comprising the steps of:

outputting a relating request specifying a desired one of accumulated dialogue streams and a desired one of accumulated objects to a server computer which has accumulated the knowledge information in response to a control input;

outputting a related information acquiring request about the desired dialogue stream and the desired object which are related to each other to the server computer in response to a control input; and displaying information transmitted from the server computer in response to the related information acquiring request.

12. An apparatus for managing knowledge information shared through a network, comprising:

dialogue stream accumulating means for managing a series of message data exchanged between persons involved in a business through the network in order to perform the business to solve a problem, and accumulating dialogue streams containing contents of the series of message data;

object accumulating means for sequentially accumulating objects required to perform the business in a process from generation of the problem to a conclusion about the problem, in a state in which the objects are required;

relating means for relating a desired one of the dialogue streams accumulated by the dialogue stream accumulating means and a desired one of the objects accumulated by the object accumulating means to each other in response to a relating request; and outputting means for outputting information about the desired dialogue stream and the desired object which are related to each other in response to a related information acquiring request.

13. An apparatus for generating knowledge information for a computer which analyzes contents of knowledge information, comprising:

collecting means responsive to a retrieval request, for collecting items of knowledge information matching the retrieval request from items of knowledge information accumulated in another computer connected through a network;

generating means for combining desired items of knowledge information from the items of knowledge information collected by the collecting means and matching the retrieval request to generate new knowledge information; and outputting means for outputting the generated new knowledge information.

14. An apparatus for using knowledge information for a computer which uses through a network knowledge information which comprises dialogue streams containing a series of message data exchanged between persons involved in a business through the network in order to perform the business to solve a problem, and objects required to perform the business in a process from generation of the problem to a conclusion about the problem, comprising the steps of:

relating request outputting means for outputting a relating request specifying a desired one of accumulated dialogue streams and a desired one of accumulated objects to a server computer which has accumulated the knowledge information in response to a control input;

related information acquiring request outputting means for outputting a related information acquiring request about the desired dialogue stream and the desired object which are related to each other to the server computer in response to a control input; and display means for displaying information transmitted from the server computer in response to the related information acquiring request.

15. A program for controlling a computer to manage knowledge information shared through a network, the program enabling the computer to perform a process comprising the steps of:

managing a series of message data exchanged between persons involved in a business through the network in order to perform the business to solve a problem, accumulating dialogue streams containing contents of the series of message data, and sequentially accumulating objects required to perform the business in a process from generation of the problem to a conclusion about the problem, in a state in which the objects are required;

relating a desired one of the accumulated dialogue streams and a desired one of the accumulated objects to each other in response to a relating request; and outputting information about the desired dialogue stream and the desired object which are related to each other in response to a related information acquiring request.

16. A program for controlling a computer to analyze contents of knowledge information, the program enabling the computer to perform a process comprising the steps of:

in response to a retrieval request, collecting items of knowledge information matching the retrieval request from items of knowledge information accumulated in another computer connected to the computer through a network;

combining desired items of knowledge information from the collected items of knowledge information matching the retrieval request to generate new knowledge information; and outputting the generated new knowledge information.

17. A program for using through a network knowledge information which comprises dialogue streams containing a series of message data exchanged between persons involved in a business through the network in order to perform the business to solve a problem, and objects required to perform the business in a process from generation of the problem to a conclusion about the problem, the program enabling a computer to perform a process comprising the steps of:

outputting a relating request specifying a desired one of accumulated dialogue streams and a desired one of accumulated objects to a server computer which has accumulated the knowledge information in response to a control input;

outputting a related information acquiring request about the desired dialogue stream and the desired object which are related to each other to the server computer in response to a control input; and displaying information transmitted from the server computer in response to the related information acquiring request.

18. A computer-readable recording medium storing a program for controlling a computer to manage knowledge information shared through a network, the program enabling the computer to perform a process comprising the steps of:

managing a series of message data exchanged between persons involved in a business through the network in order to perform the business to solve a problem, accumulating dialogue streams containing contents of the series of message data, and sequentially accumulating objects required to perform the business in a process from generation of the problem to a conclusion about the problem, in a state in which the objects are required;

relating a desired one of the accumulated dialogue streams and a desired one of the accumulated objects to each other in response to a relating request; and outputting information about the desired dialogue stream and the desired object which are related to each other in response to a related information acquiring request.

19. A computer-readable recording medium storing a program for controlling a computer to analyze contents of knowledge information, the program enabling the computer to perform a process comprising the steps of:

in response to a retrieval request, collecting items of knowledge information matching the retrieval request from items of knowledge information accumulated in another computer connected to the computer through a network;

combining desired items of knowledge information from the collected items of knowledge information matching the retrieval request to generate new knowledge information; and outputting the generated new knowledge information.

20. A computer-readable recording medium storing a program for using through a network knowledge information which comprises dialogue streams containing a series of message data exchanged between persons involved in a business through the network in order to perform the business to solve a problem, and objects required to perform the business in a process from generation of the problem to a conclusion about the problem, the program enabling a computer to perform a process comprising the steps of:

outputting a relating request specifying a desired one of accumulated dialogue streams and a desired one of accumulated objects to a server computer which has accumulated the knowledge information in response to a control input;

outputting a related information acquiring request about the desired dialogue stream and the desired object which are related to each other to the server computer in response to a control input; and displaying information transmitted from the server computer in response to the related information acquiring request.

\* \* \* \* \*